United States Patent
Sood et al.

(10) Patent No.: US 9,864,859 B2
(45) Date of Patent: *Jan. 9, 2018

(54) TECHNOLOGIES FOR SECURE BOOTSTRAPPING OF VIRTUAL NETWORK FUNCTIONS

(71) Applicant: Intel Corporation, Santa Clara, CA (US)

(72) Inventors: Kapil Sood, Beaverton, OR (US); Jesse Walker, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/437,754

(22) Filed: Feb. 21, 2017

(65) Prior Publication Data

US 2017/0161501 A1 Jun. 8, 2017

Related U.S. Application Data

(63) Continuation of application No. 14/709,170, filed on May 11, 2015, now Pat. No. 9,578,008.

(51) Int. Cl.
*G06F 21/57* (2013.01)
*H04L 29/06* (2006.01)
(Continued)

(52) U.S. Cl.
CPC .......... *G06F 21/575* (2013.01); *G06F 9/4416* (2013.01); *G06F 9/45533* (2013.01);
(Continued)

(58) Field of Classification Search
CPC ..... H04L 63/08; H04L 63/101; H04L 63/205; H04L 9/14; H04L 9/30; H04L 9/3247;
(Continued)

(56) References Cited

U.S. PATENT DOCUMENTS 8,914,626 B1 12/2014 Adogla
2008/0046548 A1 2/2008 Doran et al.
(Continued)

OTHER PUBLICATIONS

Group Specification, "ETSI GS NFC-SEC 003 V1.1.1 Network Function Virtualisation (NEV); NFV Security; Security and Trust Guidance," Dec. 2014, pp. 1-57 (see pp. 27-30, 45-49).
(Continued)

*Primary Examiner* — Hadi Armouche
*Assistant Examiner* — Shahriar Zarrineh
(74) *Attorney, Agent, or Firm* — Barnes & Thornburg LLP

(57) ABSTRACT

Technologies for bootstrapping virtual network functions in a network functions virtualization (NFV) network architecture include a virtual network function (VNF) bootstrap service (VBS) in secure network communication with a VBS agent of a VNF instance. The VBS agent is configured to execute a secure VNF bootstrap capture protocol in the NFV network architecture. Accordingly, the VBS agent can be configured to register with the VBS via secure communications transmitted between the VBS and the VBS agent. The secure communications include transmitting a security quote from a TEE of a platform on which the VNF instance is instantiated and a security credential request to the VBS, as well as receiving a security credential in response to validating the security quote and the security credential request. Other embodiments are described and claimed.

23 Claims, 9 Drawing Sheets

(51) Int. Cl.
| | | |
|---|---|---|
| *G06F 9/44* | (2006.01) | |
| *H04L 9/14* | (2006.01) | |
| *H04L 9/30* | (2006.01) | |
| *H04L 9/32* | (2006.01) | |
| *G06F 21/53* | (2013.01) | |
| *G06F 9/455* | (2006.01) | |

(52) U.S. Cl.
CPC ............... *G06F 21/53* (2013.01); *H04L 9/14* (2013.01); *H04L 9/30* (2013.01); *H04L 9/3247* (2013.01); *H04L 63/08* (2013.01); *H04L 63/101* (2013.01); *H04L 63/205* (2013.01); *G06F 2221/034* (2013.01)

(58) Field of Classification Search
CPC ...... G06F 21/53; G06F 21/575; G06F 9/4416; G06F 9/45533
USPC .......................................................... 726/1
See application file for complete search history.

(56) References Cited

U.S. PATENT DOCUMENTS

| | | | |
|---|---|---|---|
| 2009/0083532 A1 | 3/2009 | Brannock | |
| 2011/0055411 A1 | 3/2011 | Taaghol | |
| 2011/0126017 A1 | 5/2011 | Blom et al. | |
| 2011/0302400 A1 | 12/2011 | Maino et al. | |
| 2012/0222091 A1 | 8/2012 | Castellanos Zamora et al. | |
| 2013/0013755 A1 | 1/2013 | Huang | |
| 2013/0117567 A1 | 5/2013 | Chang | |
| 2013/0227660 A1* | 8/2013 | Murakami | H04L 63/062 726/5 |
| 2014/0040886 A1 | 2/2014 | Coles | |
| 2014/0181248 A1 | 6/2014 | Deutsch | |
| 2014/0201374 A1* | 7/2014 | Ashwood-Smith | H04L 49/70 709/226 |
| 2014/0317293 A1* | 10/2014 | Shatzkamer | G06F 9/455 709/226 |
| 2015/0063166 A1* | 3/2015 | Sif | G06F 9/45558 370/254 |
| 2015/0082308 A1 | 3/2015 | Kiess | |
| 2015/0178113 A1 | 6/2015 | Dake | |
| 2015/0180730 A1* | 6/2015 | Felstaine | H04L 41/022 709/225 |
| 2015/0222515 A1 | 8/2015 | Mimura | |
| 2015/0295750 A1 | 10/2015 | Blanco | |
| 2015/0326535 A1* | 11/2015 | Rao | H04L 63/029 726/15 |
| 2015/0358248 A1* | 12/2015 | Saha | H04L 43/0817 709/226 |
| 2015/0381423 A1* | 12/2015 | Xiang | H04L 41/0893 709/223 |
| 2016/0006696 A1* | 1/2016 | Donley | H04L 63/0236 709/223 |
| 2016/0043944 A1* | 2/2016 | Felstaine | H04L 43/12 370/389 |
| 2016/0050161 A1 | 2/2016 | Da | |
| 2016/0149771 A1* | 5/2016 | Prasad | H04L 41/5054 709/226 |
| 2016/0149774 A1 | 5/2016 | Chastain | |
| 2016/0156718 A1* | 6/2016 | Allan | H04L 67/10 709/228 |
| 2016/0212012 A1* | 7/2016 | Young | H04L 41/14 |
| 2017/0012968 A1* | 1/2017 | Feng | H04L 12/6418 |
| 2017/0054710 A1* | 2/2017 | Xiong | H04L 29/06 |

OTHER PUBLICATIONS

International Search Report for PCT Application No. PCT/US2016/026888, mailed Jul. 8, 2016 (3 pages).
Written Opinion for PCT Application No. PCT/US2016/026888, mailed Jul. 8, 2016 (8 pages).

\* cited by examiner

TECHNOLOGIES FOR SECURE
BOOTSTRAPPING OF VIRTUAL NETWORK
FUNCTIONS

CROSS-REFERENCE TO RELATED
APPLICATIONS

The present application is a continuation application of U.S. application Ser. No. 14/709,170, entitled "TECHNOLOGIES FOR SECURE BOOTSTRAPPING OF VIRTUAL NETWORK FUNCTIONS," which was filed on May 11, 2015.

BACKGROUND

Network operators and service providers typically rely on various network virtualization technologies to manage complex, large-scale computing environments, such as high-performance computing (HPC) and cloud computing environments. For example, network operators and service provider networks may rely on network function virtualization (NFV) deployments to deploy network services (e.g., firewall services, network address translation (NAT) services, load-balancing services, deep packet inspection (DPI) services, transmission control protocol (TCP) optimization services, etc.). Such NFV deployments typically use an NFV infrastructure to orchestrate various virtual machines (VMs) and/or containers (e.g., in a commodity server) to perform virtualized network services, commonly referred to as virtualized network functions (VNFs), on network traffic and to manage the network traffic across the various VMs and/or containers.

Unlike traditional, non-virtualized deployments, virtualized deployments decouple network functions from underlying hardware, which results in network functions and services that are highly dynamic and generally capable of being executed on off-the-shelf servers with general purpose processors. As such, the VNFs can be scaled-in/out as necessary based on particular functions or network services to be performed on the network traffic. Further, the VNFs can be deployed across geographies, on hosted infrastructure, etc., as a per subscriber demand.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
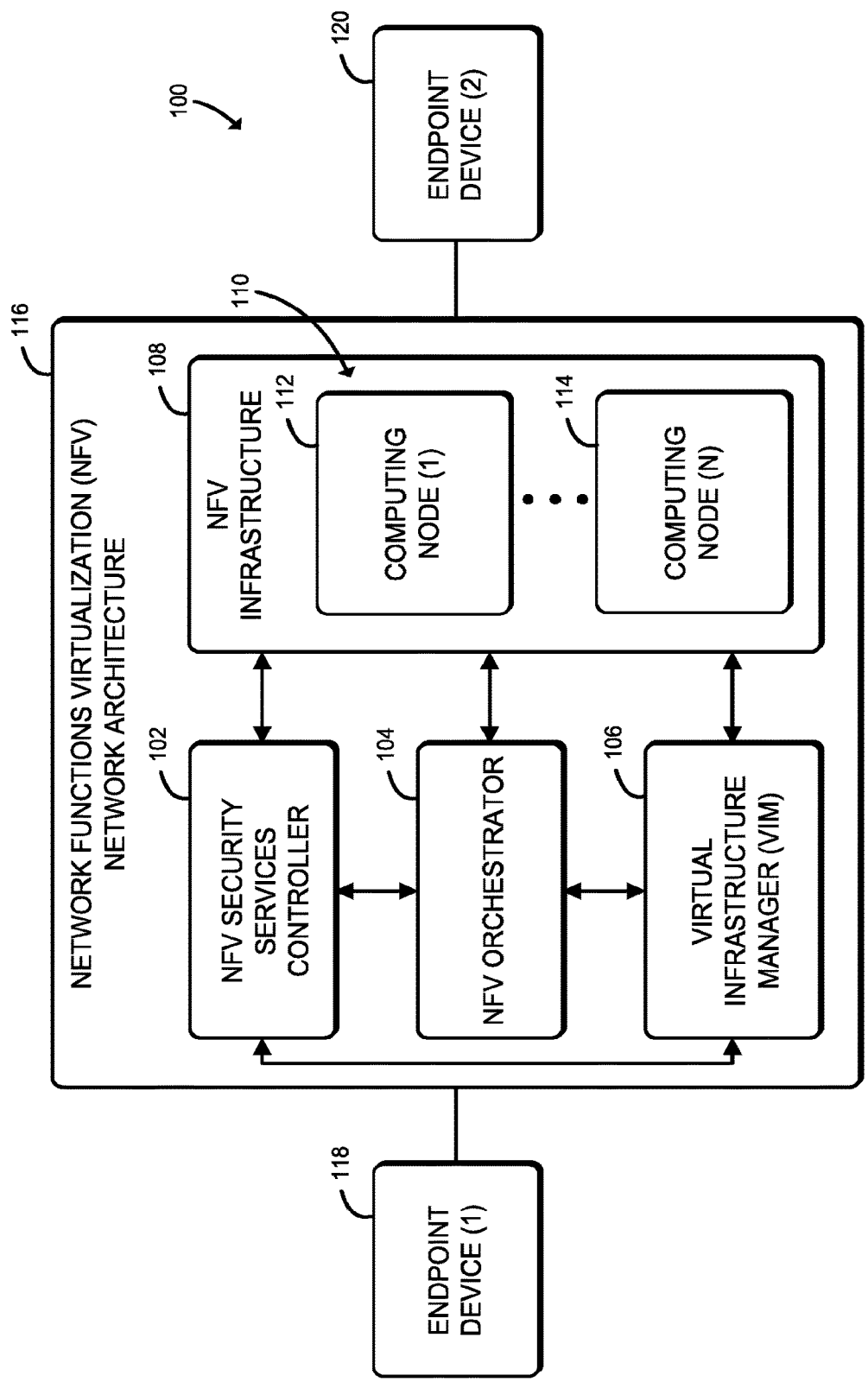
FIG. 1 is a simplified block diagram of at least one embodiment of a system for processing network communications at a network functions virtualization (NFV) network architecture that includes one or more computing nodes of an NFV infrastructure.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C): (A and B); (A and C); (B and C); or (A, B, and C). Similarly, items listed in the form of "at least one of A, B, or C" can mean (A); (B); (C): (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for processing network traffic at a network functions virtualization (NFV) network architecture 116 includes a number of network processing components, including an NFV orchestrator 104, a virtual infrastructure manager (VIM) 106, and an NFV infrastructure 108. Additionally, the NFV network architecture 116 includes an NFV security services controller 102 for managing and enforcing security monitoring and secure message transmission (e.g., setting up secure communication channels, authenticating messages transmitted across the secure communication channels, maintaining security of the secure communication channels, etc.) over the NFV network architecture 116. As part of the initialization process of a virtual network function (VNF) instance of the NFV network architecture 116, the NFV security services controller 102 provides a secure message to a previously instantiated VNF instance of the NFV infrastructure 108 that indicates to the VNF instance to perform a secure bootstrap. To do so, the NFV security services controller 102 includes a VNF bootstrap service (see FIG. 4) and the VNF instance includes a VNF bootstrap service (VBS) agent (see FIG. 4), which is responsible for performing the secure bootstrap and transmitting/receiving messages. Accordingly, the VNF instance can use the VBS agent to register with the NFV security services controller 102 as an operational VNF instance and receive VNF bootstrap information, such as start-up policies, configuration information, and securely register as an operational VNF instance. Additionally, in some embodiments, the VBS agent can enable VNF instance licensing and enforcement.

The network processing and security monitoring components of the NFV network architecture 116 can be deployed in various virtualization network architectures, such as a virtual Evolved Packet Core (vEPC) infrastructure, a virtualized Customer Premise Equipment (vCPE) infrastructure, or any other type of operator visualized infrastructures. It should be appreciated that, depending on the network architecture in which the NFV network architecture 116 is deployed, the NFV network architecture 116 may include one or more NFV security services controllers 102, one or more NFV orchestrators 104, one or more VIMs 106, and/or one or more NFV infrastructures 108. It should be further appreciated that, in some embodiments, the NFV security services controller 102 may be co-located with the NFV orchestrator 104 and/or the VIM 106, such as in an NFV management and orchestration (MANO) architectural framework.

The NFV infrastructure 108 includes one or more computing nodes 110 capable of managing (e.g., creating, moving, destroying, etc.) a number of VMs and/or containers (e.g., in a commodity server) that are configured to run as VNF instances. Each VNF instance typically relies on one or more VMs, which may be running different software and/or processes to perform network services on network traffic (e.g., firewall services, network address translation (NAT) services, load-balancing services, deep packet inspection (DPI) services, transmission control protocol (TCP) optimization services, etc.). Further, to provide certain network services, multiple VNF instances may be created as a service function chain, or a VNF forwarding graph (i.e., a series of VNF instances performed in an ordered sequence to implement the desired network service).

The NFV security services controller 102 may be embodied as, or otherwise include, any type of hardware, software, and/or firmware capable of performing the functions described herein. As will be described in further detail below, the NFV security services controller 102 is configured to function as a security monitoring orchestrator. To do so, the NFV security services controller 102 is configured to transmit a security monitoring policy that includes various monitoring rules, which include secure communication path policies, configuration parameters, and function descriptors to components throughout the NFV network architecture 116 (e.g., the VNF instances located in the NFV network architecture 116). The various security functions may include, but are not limited to, securing service function chaining (SFC) provisioning, enforcing SFC security configuration and monitoring, providing confidentiality protected tokens, managing protected policy transmission, and providing inter-VNF SFC path protection.

To retrieve and/or update the security monitoring policies, the NFV security services controller 102 may be configured to interface with one or more external security systems (e.g., an Intel® Security Controller), security databases, and/or security policy engines. To communicate with the external security systems, the NFV security services controller 102 may deliver an application programming interface (API) and/or the security policy to the external security services orchestration systems. In some embodiments, the NFV security services controller 102 may act as a trusted third party to authenticate messages across the various network and security monitoring components of the NFV network architecture 116. It should be appreciated that, in some embodiments, the NFV security services controller 102 may have a higher security privilege than the other network and security monitoring components of the NFV network architecture 116 to ensure the integrity and security of the NFV security services controller 102.

The NFV orchestrator 104 may be embodied as, or otherwise include, any type of hardware, software, and/or firmware capable of performing the functions described herein, such as managing the lifecycle of the VNF instances (e.g., instantiation, scale-out/in, performance measurements, event correlation, termination, etc.) via a VNF manager (see FIG. 4), managing global resources, validating and authorizing resource requests of the NFV infrastructure 108, on-boarding of new VNF instances, and/or managing various policies and packages for the VNF instances. For example, the NFV orchestrator 104 may be configured to receive resource requests from a network operator that impacts a particular VNF. In use, the NFV orchestrator 104 manages any applicable processing, storage, and/or network configuration adjustments, based on the operator requests, to bring the VNF into operation or into compliance with the resource requests. Once in operation, the NFV orchestrator 104 may monitor the VNF for capacity and utilization, which may be adjusted by the NFV orchestrator 104, as necessary.

The VIM 106 may be embodied as, or otherwise include, any type of hardware, software, and/or firmware capable of performing the functions described herein. The VIM 106 is configured to control and manage compute, storage, and network resources (e.g., physical and virtual) of the NFV infrastructure 108, such as within one operator's infrastructure sub-domain. Additionally, the VIM 106 is configured to collect and forward various information related to the VIM 106, such as performance measurements and events.

The NFV infrastructure 108 may be embodied as, or otherwise include, any type of virtual and/or physical processing and storage resources, such as one or more servers or other computing nodes, as well as virtualization software. For example, the illustrative NFV infrastructure 108 includes one or more computing nodes 110. The illustrative computing nodes 110 include a first computing node, which is designated as computing node (1) 112, and a second computing node, which is designated as computing node (N) 114 (i.e., the "Nth" computing node of the computing nodes 110, wherein "N" is a positive integer and designates one or more additional computing nodes 110).

Figure 2:
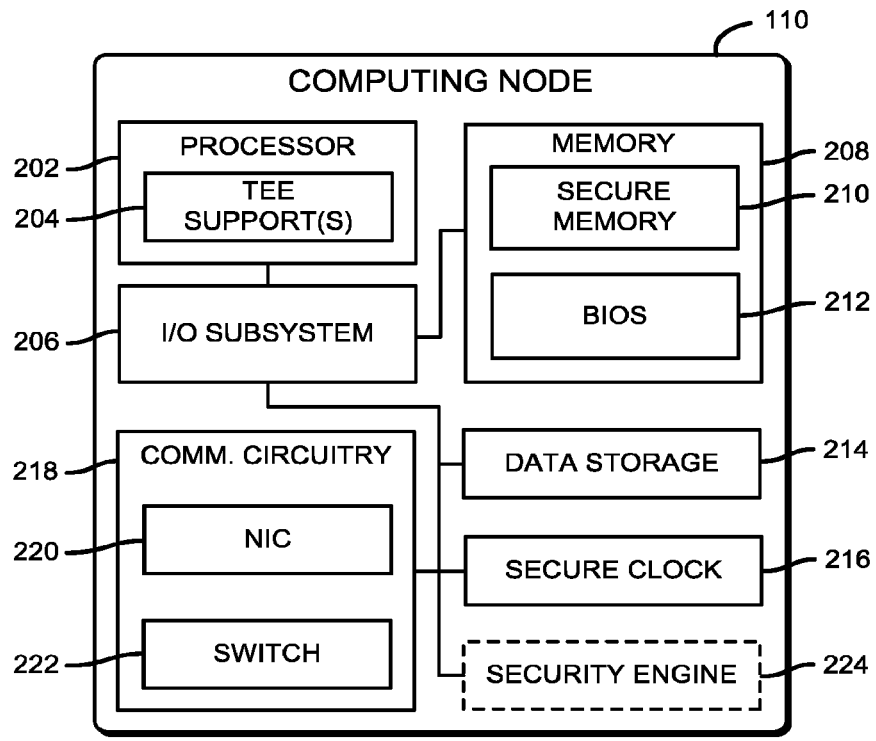
FIG. 2 is a simplified block diagram of at least one embodiment of one of the computing nodes of the system of FIG. 1.

Each of the computing nodes 110 may be embodied as any type of computation or computer device capable of performing the functions described herein, including, without limitation, a server (e.g., stand-alone, rack-mounted, blade, etc.), a network appliance (e.g., physical or virtual), a high-performance computing device, a web appliance, a distributed computing system, a computer, a processor-based system, a multiprocessor system, a smartphone, a tablet computer, a laptop computer, a notebook computer, and/or a mobile computing device. As shown in FIG. 2, in an embodiment, each of the computing nodes 110 illustratively includes a processor 202, an input/output (I/O) subsystem 206, a memory 208, a data storage device 214, a secure clock 216, and communication circuitry 218. Of course, the computing node 110 may include other or additional components, such as those commonly found in a server (e.g., various input/output devices), in other embodiments. Additionally, in some embodiments, one or more of the illustrative components may be incorporated in, or otherwise form a portion of, another component. For example, the memory 208, or portions thereof, may be incorporated in the processor 202 in some embodiments.

The processor 202 may be embodied as any type of processor capable of performing the functions described herein. For example, the processor 202 may be embodied as a single or multi-core processor(s), digital signal processor, microcontroller, or other processor or processing/controlling circuit. The illustrative processor 202 includes one or more trusted execution environment (TEE) supports 204, or secure enclave supports, which may be utilized by the computing node 110 in establishing a trusted execution environment. It should be appreciated that, in some embodiments, the TEE supports 204 provide hardware-reinforced security for the trusted execution environment in which executing code may be measured, verified, or otherwise determined to be authentic. For example, the TEE supports 204 may be embodied as Intel® Software Guard Extensions (SGX) technology. Although the TEE supports 204 are illustratively shown in the processor 202, it should be appreciated that, in some embodiments, one or more of the other components of the computing node 110 may include the TEE supports 204. Further, in some embodiments, processor 202 of the computing node 110 may include a security engine (e.g., security engine 224 discussed below), a manageability engine, or a security co-processor configured to utilize the TEE supports 204 to establish a trusted execution environment.

The memory 208 may be embodied as any type of volatile or non-volatile memory or data storage capable of performing the functions described herein. In operation, the memory 208 may store various data and software used during operation of the computing node 110 such as operating systems, applications, programs, libraries, and drivers. The memory 208 is communicatively coupled to the processor 202 via the I/O subsystem 206, which may be embodied as circuitry and/or components to facilitate input/output operations with the processor 202, the memory 208, and other components of the computing node 110. For example, the I/O subsystem 206 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The illustrative memory 208 includes a secure memory 210. In some embodiments, the secure memory 210 may be embodied as a secure partition of the memory 208; whereas, in other embodiments, the secure memory 210 may be embodied or included on a separate hardware component of the computing node 110. As described herein, the secure memory 210 may store various data provisioned to the computing node 110. For example, the secure memory 210 may store a secure key (e.g., an attestation key, a private direct anonymous attestation (DAA) key, an Enhanced Privacy Identification (EPID) key, or any other type of secure/cryptographic key) of the computing node 110 that may be provisioned by a manufacturer of the chipset and/or of a trusted execution environment. The secure memory 210 may also store a password, PIN, or other unique identifier of the computing node 110 provisioned therein, for example, by an original equipment manufacturer (OEM) of the computing node 110. Of course, it should be appreciated that the secure memory 210 may store various other data depending on the particular embodiment (e.g., group names, device identifiers, whitelists, expected PIN values, etc.). In some embodiments, the provisioned data may be stored in read-only memory of the secure memory 210.

The illustrative memory 208 additionally includes a basic input/output system (BIOS) 212. The BIOS 212 includes instructions (e.g., a BIOS driver used during booting of the computing node 110) to initialize the computing node 110 during the boot process. In some embodiments, the computing node 110 may facilitate the orchestration of the VNF instances through a main platform firmware, or pre-boot firmware, such as an extension of the Intel® platform chipset or the platform BIOS 212 based on the Unified Extensible Firmware Interface ("UEFI") specification, which has several versions published by the Unified EFI Forum.

The data storage device 214 may be embodied as any type of device or devices configured for short-term or long-term storage of data such as, for example, memory devices and circuits, memory cards, hard disk drives, solid-state drives, or other data storage devices. In use, as described below, the data storage device 214 and/or the memory 208 may store security monitoring policies, configuration policies, or other, similar data.

The secure clock 216 may be embodied as any hardware component(s) or circuitry capable of providing a secure timing signal and otherwise performing the functions described herein. For example, in the illustrative embodiment, the secure clock 216 may generate a timing signal that is separate and functionally independent from other clock sources of the computing node 110. Accordingly, in such embodiments, the secure clock 216 may be immune or resistant to alteration by other entities such as, for example, software executing on the computing node 110. It should be appreciated that, in some embodiments, the secure clock 216 may be embodied as standalone component(s) or circuitry, whereas in other embodiments the secure clock 216 may be integrated with or form a secure portion of another component (e.g., the processor 202). For example, in some embodiments, the secure clock 216 may be implemented via an on-chip oscillator and/or embodied as a secure clock of a manageability engine (ME). It should further be appreciated that the secure clock 216 may be synchronized to the secure clocks of the other computing nodes 110 and granularity may be of the order that can distinguish distinct message timings.

The communication circuitry 218 of the computing node 110 may be embodied as any communication circuit, device, or collection thereof, capable of enabling communications between the computing node 110 and another computing node 110, the NFV orchestrator 104, the VIM 106, the endpoint devices 118, 120, and/or other connected network enabled computing node. The communication circuitry 218 may be configured to use any one or more communication technology (e.g., wired or wireless communications) and associated protocols (e.g., Ethernet, Bluetooth®, Wi-Fi®, WiMAX, GSM, LTE, etc.) to effect such communication. The illustrative communication circuitry 218 includes a network interface card (NIC) 220 and a switch 222. The NIC 220 may be embodied as one or more add-in-boards, daughtercards, network interface cards, controller chips, chipsets, or other devices that may be used by the computing node 110. For example, the NIC 220 may be embodied as an expansion card coupled to the I/O subsystem 206 over an expansion bus, such as PCI Express. The switch 222 may be embodied as any hardware component(s) or circuitry capable of performing network switch operations and otherwise performing the functions described herein, such as an Ethernet switch chip, a PCI Express switching chip, etc.

As discussed above, the computing node 110 may also include a security engine 224, which may be embodied as any hardware component(s) or circuitry capable of establishing a trusted execution environment (TEE) on the computing node 110. In particular, the security engine 224 may support executing code and/or accessing data that is independent and secure from other code executed by the computing node 110. The security engine 224 may be embodied as a Trusted Platform Module (TPM), a manageability engine (ME), an out-of-band processor, or other security engine device or collection of devices (e.g., a trusted zone (TZ) of an an ARM® processor). In some embodiments the security engine 224 may be embodied as a converged security and manageability engine (CSME) incorporated in a system-on-a-chip (SoC) of the computing node 110.

Referring again to FIG. 1, the illustrative NFV network architecture 116 is communicatively coupled between the two endpoint devices 118, 120. In the illustrative system 100, the first endpoint device is designated as endpoint device (1) 118 and the second endpoint device is designated as endpoint device (2) 120. However, it should be appreciated that any number of endpoint devices may be connected through the NFV network architecture 116. The endpoint devices 118, 120 are communicatively coupled with the NFV network architecture 116 via a network (not shown), using wired or wireless technology, to form an end-to-end communication system in which the endpoint device (1) can communicate with the endpoint device (2), and vice versa. Accordingly, the NFV network architecture 116 can monitor and process the network communication traffic (i.e., network packets) transmitted between the endpoint devices 118, 120.

The network, via which the endpoint devices 118, 120 communicate, may be embodied as any type of wired or wireless communication network, including cellular networks, such as Global System for Mobile Communications (GSM) or Long-Term Evolution (LTE), telephony networks, digital subscriber line (DSL) networks, cable networks, local or wide area networks, global networks (e.g., the Internet), or any combination thereof. For example, in some embodiments, the network may be embodied as an NFV-based Long-Term Evolution (LTE) network having a vEPC architecture. It should be appreciated that the network may serve as a centralized network and, in some embodiments, may be communicatively coupled to another network (e.g., the Internet). Accordingly, the network may include a variety of network devices, virtual and physical, such as routers, switches, network hubs, servers, storage devices, compute devices, etc., as needed to facilitate communication between the endpoint devices 118, 120 and the NFV network architecture 116.

Figure 3:
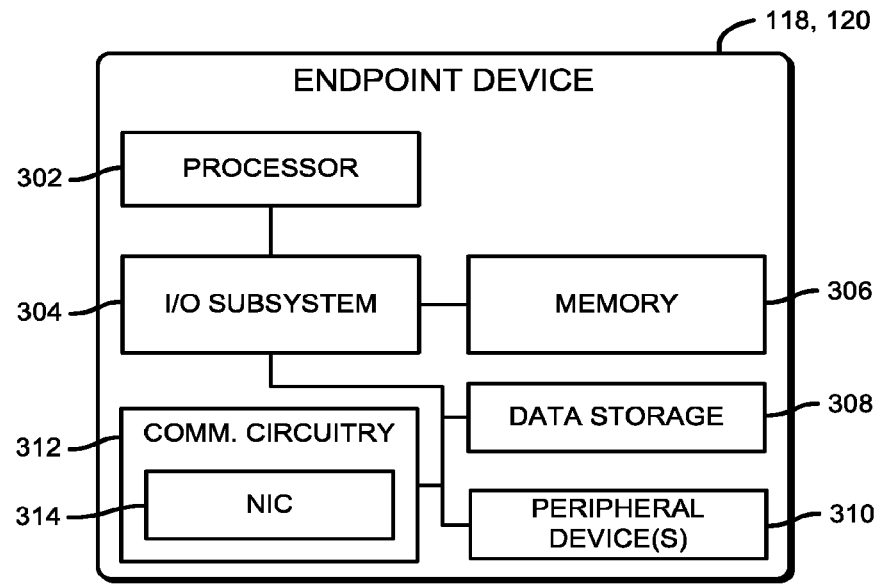
FIG. 3 is a simplified block diagram of at least one embodiment of an endpoint device of the system of FIG. 1.

The endpoint devices 118, 120 may be embodied as any type of computation or computer device capable of performing the functions described herein, including, without limitation, a smartphone, a mobile computing device, a tablet computer, a laptop computer, a notebook computer, a computer, a server (e.g., stand-alone, rack-mounted, blade, etc.), a network appliance (e.g., physical or virtual), a web appliance, a distributed computing system, a processor-based system, and/or a multiprocessor system. As shown in FIG. 3, similar to the computing node 110 of FIG. 2, the illustrative endpoint device (e.g., one of the endpoint devices 118, 120 of FIG. 1) includes a processor 302, an input/output (I/O) subsystem 304, a memory 306, a data storage device 308, one or more peripheral devices 310, and communication circuitry 312. As such, further descriptions of the like components are not repeated herein for clarity of the description with the understanding that the description of the corresponding components provided above in regard to the computing node 110 applies equally to the corresponding components of the endpoint devices 118, 120.

Of course, the endpoint devices 118, 120 may include other or additional components, such as those commonly found in a mobile computing device capable of operating in a telecommunications infrastructure in other embodiments (e.g., various input/output devices). Additionally, in some embodiments, one or more of the illustrative components may be incorporated in, or otherwise form a portion of, another component. The peripheral devices 310 may include any number of input/output devices, interface devices, and/or other peripheral devices. For example, in some embodiments, the peripheral devices 310 may include a display, touch screen, graphics circuitry, keyboard, mouse, speaker system, and/or other input/output devices, interface devices, and/or peripheral devices.

Figure 4:
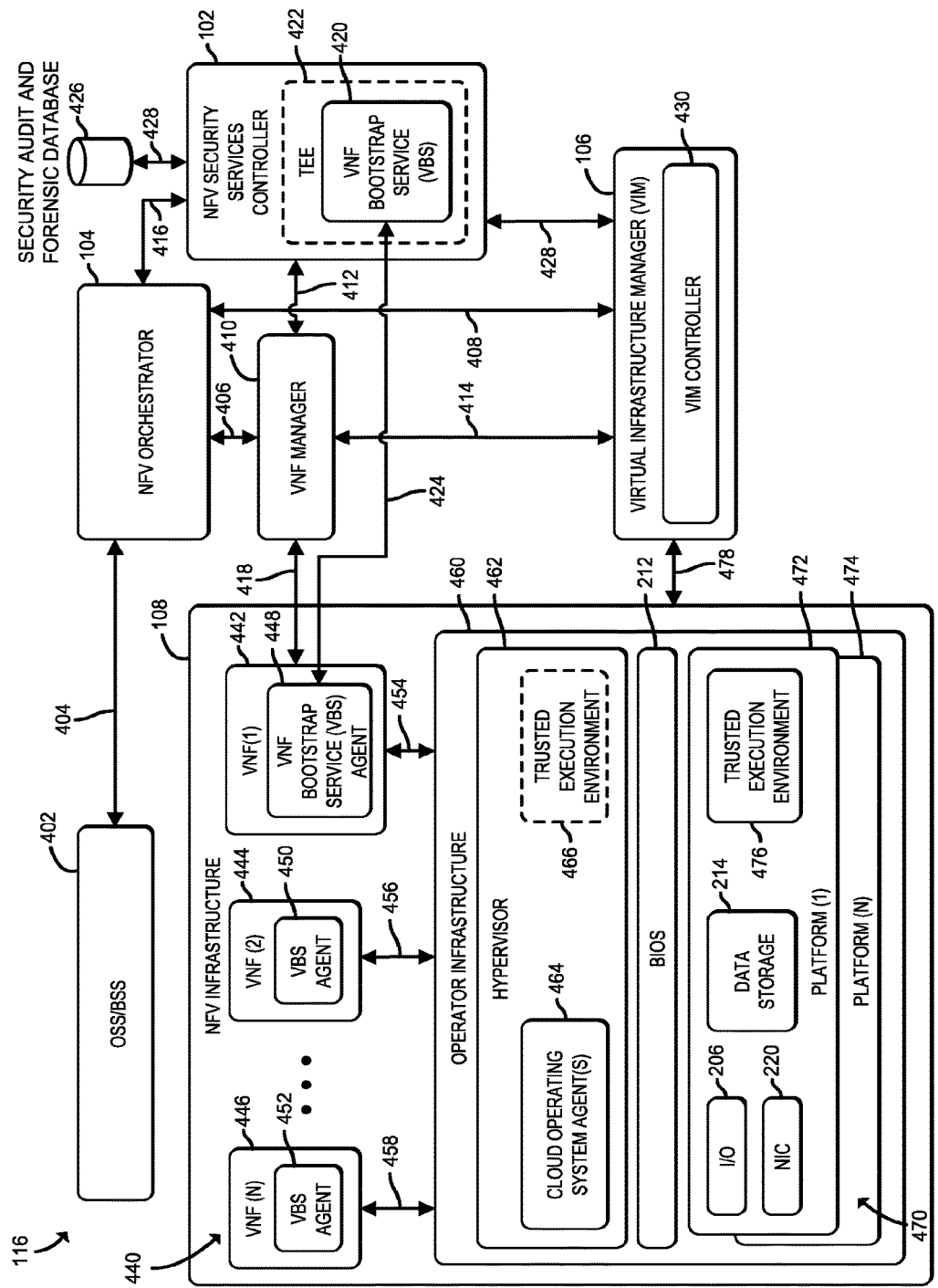
FIG. 4 is a simplified block diagram of at least one embodiment of the NFV network architecture of the system of FIG. 1.

Referring now to FIG. 4, an illustrative embodiment of the NFV network architecture 116 of FIG. 1 for securely bootstrapping a VNF of the NFV network architecture 116 includes the NFV security services controller 102, the NFV orchestrator 104, the VIM 106, and the NFV infrastructure 108 of FIG. 1, as well as a VNF manager 410. As described previously, in use, the NFV orchestrator 104 manages the lifecycle of the VNF instances in the NFV infrastructure 108, including instantiation, scaling-out/in, measuring performance, correlating events, termination, etc. To do so, the NFV orchestrator 104 is configured to provide instructions to the VNF manager 410 via a secure communication channel 406 to manage the initialization and configuration (i.e., scaling and deployment) of the VNF instances of the NFV infrastructure 108 (see the VNF instances 440) based on resources of the NFV infrastructure 108.

The VNF manager 410 is further configured to perform overall coordination and adaptation for configuration and event reporting for the NFV infrastructure 108. The VNF manager 410 is additionally configured to update and ensure the integrity of the VNF instances. To do so, the VNF manager 410 is configured to communicate with the VIM 106 via a secure communication channel 414 to determine the available physical resources on which to instantiate particular VNF instances. It should be appreciated that the VIM 106 may make such a determination using any suitable techniques, algorithms, and/or mechanisms. It should be further appreciated that, in some embodiments a single VNF manger 410 may be responsible for managing one or more VNF instances. In other words, in some embodiments, a VNF manager 410 may be instantiated for each of the VNF instances.

The NFV network architecture 116 additionally includes an operations support systems and business support systems (OSS/BSS) 402 that is communicatively coupled to the NFV orchestrator 104 via a communication channel 404. The OSS/BSS 402 may be embodied as any type of computation or computing node capable of performing the functions described herein, such as supporting various end-to-end telecommunication services in a telephone network. In some embodiments, the OSS/BSS 402 may be configured to support management functions such as network inventory, service provisioning, network configuration, and fault management, as well as various business functions to support end-to-end telecommunication services that may be supported by the OSS/BSS 402, such as product management, customer management, revenue management, order management, etc.

The NFV security services controller 102 is communicatively coupled to the NFV orchestrator 104 via a secure communication channel 416. It should be appreciated that, in some embodiments, the NFV security services controller 102 and the NFV orchestrator 104 may be co-located, such as in the MANO architectural framework. Further, the NFV security services controller 102 is communicatively coupled to the VIM 106 via a secure communication channel 428 and the NFV orchestrator 104 is communicatively coupled to the VIM 106 via a secure communication channel 408. The secure communication channels of the NFV network architecture 116 (e.g., the secure communication channel 406, the secure communication channel 414, etc.) may be protected with secure keys (e.g., session keys and/or other cryptographic keys) used by the NFV security services controller 102 to establish a root of trust (RoT) to establish the communication channels. In some embodiments, the secure keys may be embodied as pairwise session keys that may be refreshed periodically. As such, the NFV security services controller 102 can be configured to act as an authentication server.

The NFV security services controller 102 includes the VNF bootstrap service (VBS) 420 that is configured to manage the VBS agents, described further below, of the VNF instances in the NFV infrastructure 108. In use, the VBS 420 manages the secure bootstrap process (i.e., execution of the secure VNF bootstrap capture protocol of FIGS. 9 and 10) from a trust anchor perspective. Accordingly, in some embodiments, the NFV security services controller 102 may additionally include a trusted execution environment (TEE) 422 in which the VBS 420 may reside. It should be appreciated, however, that in some embodiments, the VBS 420 may reside outside of the NFV security services controller 102, such as on a dedicated VBS server. In such embodiments, the VBS 420 may still be run in a TEE.

Additionally, the illustrative NFV security services controller 102 interfaces with a security audit and forensic database 426. The security audit and forensic database 426 is embodied as a secure database that includes security audit information relative to the various security monitoring components of the NFV network architecture 116. The security audit information may include any information related to the security of the NFV network architecture 116 including, for example, configuration change logs, network traces, debug traces, application traces, etc. In the illustrative NFV network architecture 116, the security audit and forensic database 426 is additionally configured to interface with other network and security monitoring components of the NFV network architecture 116, such as the VIM 106 and the various NFV security services agents distributed across the NFV network architecture 116, which will be discussed in further detail below. In some embodiments, the various security monitoring components of the illustrative NFV network architecture 116 that interface with the security audit and forensic database 426 may use a secure clock (e.g., the secure clock 216 of FIG. 2) to timestamp the logs received at the security audit and forensic database 426 for secure storage.

As described previously, in use, the VIM 106 controls and manages the allocation of virtual and physical (i.e., hardware) compute, storage, and network resources of the NFV infrastructure 108 through messages securely transmitted via a secure communication channel 478. Additionally, in some embodiments, the VIM 106 may be configured to collect and securely forward performance measurements and events of the NFV infrastructure 108 compute, storage, and network resources (e.g., physical and virtual) to the security audit and forensic database 426. The illustrative VIM 106 includes a VIM controller 430. The VIM controller 430 is configured to function as a cloud operating system VNF install and activate service. For example, in some embodiments, the VIM controller may be embodied as a network policy controller, or a networking service controller (e.g., a software defined networking (SDN) controller or an OpenStack Neutron), or as a compute service controller (e.g., Openstack Nova). Additionally or alternatively, in some embodiments, the VIM controller 430 may be embodied as an image service controller, an identity service controller, etc.

The NFV infrastructure 108 includes all of the hardware and software components (i.e., virtual compute, storage, and network resources, virtualization software, hardware compute, storage, and network resources, etc.) of the computing nodes 110 from which the VNF instances may be deployed. It should be appreciated that the physical and/or virtual components of the NFV infrastructure 108 may span across different locations, data centers, geographies, providers, etc. Additionally, it should be further appreciated that the network through which the components of the NFV infrastructure 108 use to communicate and interface through may be considered to be included in the NFV infrastructure 108.

The illustrative NFV infrastructure 108 includes a number of VNF instances 440 and an operator infrastructure 460. The operator infrastructure 460 includes one or more platforms 470, the BIOS 212 of FIG. 2, and a hypervisor 462. The operator infrastructure 460 may include multiple different network infrastructures for deploying the VNF instances 440. Accordingly, an operator can use the multiple different network infrastructures to deploy on the NFV infrastructure 108 (i.e., a physical infrastructure) or on another operators physical infrastructure, as well as on a third party cloud hosting infrastructure and/or at a customer's premises on customer equipment, etc. For example, deployment scenarios may include a monolithic operator operating in a private cloud model, a network operator hosting virtual network operators in a hybrid cloud, a hosted network operator, hosted communications and application providers in a public cloud model, managed network services on customer premises/equipment, etc.

The illustrative platforms 470 include a first platform, which is designated as platform (1) 472, and a second platform, which is designated as platform (N) 474 (i.e., the "Nth" platform, wherein "N" is a positive integer and designates one or more additional platforms). Each of the platforms 470 includes the I/O subsystem 206, the NIC 220 (or the switch 222), and the data storage of FIG. 2. Each of the platforms 470 additionally includes an identifier (e.g., a BIOS 212 (UEFI) identifier) unique to that platform, which can be stored in a secure location (e.g., the secure memory 210). The unique platform identifier may be a combination hash, or globally unique identifier (GUID), of a hardware identifier, an original equipment manufacturer (OEM) board identifier, a BIOS/UEFI stock keeping unit (SKU) identifier, a field replaceable unit (FRU) identifier, an operating system version identifier, etc.

The illustrative platform (1) 472 additionally includes a TEE 476. The TEE 476 may be established by a CSME, an SGX, an IE, an ME, or a physical, virtual (i.e., software-based), or firmware TPM (e.g., a firmware TPM on the security engine 224 that consists of a secure partition, a security co-processor or separate processor core, etc.) in a secure environment (e.g., the TEE supports 204 of the processor 202). Additionally, the TEE 476 can be securely provisioned in the platform (1) 472 through a secure provisioning procedure with the NFV security services controller 102. In some embodiments, the secure provisioning procedure may be performed via a bootstrap with the NFV security services controller 102. Additionally or alternatively, in some embodiments, the secure provisioning procedure may be performed offline.

The hypervisor 462, or virtual machine monitor (VMM), is configured to establish and/or utilize various virtualized hardware resources (e.g., virtual memory, virtual operating systems, virtual networking components, etc.) of the NFV infrastructure 108. Additionally, the hypervisor 462 may facilitate communication across the VNF instances 440. The illustrative hypervisor 462 includes one or more cloud operating system agents 464 that may be configured to bolster cloud service discovery, service negotiation, and/or service composition. In some embodiments, the hypervisor 462 may additionally include a TEE 466 that is configured to function similar to the TEE 476, but at the virtual, or hypervisor, level of the NFV infrastructure 108.

The hypervisor 462, in use, runs the VNF instances 440, generally via one or more VMs and/or containers for running each of the VNF instances 440. In some embodiments, the VNF instances 440 may include a billing function, a virtual switch (vSwitch), a virtual router (vRouter), a firewall, a network address translation (NAT), a DPI, an evolved packet core (EPC), a mobility management entity (MME), a packet data network gateway (PGW), a serving gateway (SGW), and/or other virtual network function. In some embodiments, a particular VNF instance 440 may have multiple sub-instances, which could be executing on a single platform (e.g., the platform 472) or across different platforms (e.g., the platform 472 and the platform 474). In other words, when virtualized, network functions traditionally handled by physical hardware co-located with a particular platform may be distributed as a number of VNF instances 440 across one or more of the platforms 480.

Each of the VNF instances 440 may include one or more VNF instances. For example, in some embodiments, any of the VNF instances 440 may bundle multiple VNF instances of a service function chain. Further, each of the VNF instances may include one or more VNF components (VNFCs) (not shown). It should be appreciated that the VNF instances 440 may be embodied as any suitable virtual network functions; similarly, the VNFCs may be embodied as any suitable VNF components. The VNFCs are processes and/or instances that cooperate to deliver the functionality of one or more VNF instances 440. For example, in some embodiments, the VNFCs may be sub-modules of the VNF instances 440. Similar to the VNF instances 440, it should be appreciated that the VNFCs may be distributed across one or more platforms 470. It should be further appreciated that a particular VNF instance 440 may be distributed across multiple platforms 470 and still form a part of a VNF instance 440 established on a one of the platforms 470. In such embodiments, the VNF instances 440 and/or the VNFCs may be executing on the same platform (e.g., the platform 472 or the platform 474) or within the same data center but on different platforms 470. Further, in some embodiments, the VNF instances 440 and/or the VNFCs may be executing across different data centers. Similar to the hypervisor 462 facilitating communication across the VNF instances 440, the hypervisor 462 may additionally facilitate communications across the VNFCs.

The illustrative VNF instances 440 include a first VNF instance, which is designated as VNF (1) 442, a second VNF instance, which is designated as VNF (2) 444, and a third VNF instance, which is designated as VNF (N) 446 (i.e., the "Nth" VNF, wherein "N" is a positive integer and designates one or more additional VNF instances). Each of the VNF instances 440 are configured to perform as a virtual networking device (e.g., a vSwitch, a vRouter, a firewall, a NAT, a DPI, an EPC, an MME, a PGW, a SGW, etc.). In some embodiments, one or more VNF instances 440 may comprise a service function chain that is capable of performing a particular virtual function or service. One or more of the VNF instances 440 may include a packet processor (not shown) to process the network traffic at the user data plane, such as the Intel® Data Plane Development Kit (Intel® DPDK).

Similar to the identifier unique to each of the platforms 470, each of the VNF instances 440 includes a unique identifier. The unique VNF instance identifier of the VNF instance 440 may be a combination hash, or a GUID, of an image of the VNF instance 440, a VNF descriptor identifier, a VNF command line identifier, a VNF OEM identifier, a VNF vendor identifier, and/or VNFC identifiers. Accordingly, the unique VNF instance identifier may be used by the NFV security services controller 102, the VIM 106, and/or the VNF manager 410 when securely communicating with the VNF instances 440. For example, the VIM 106 may initiate the spinning up a VNF instance at the NFV infrastructure 108 via a secure communication channel 478 using the unique VNF instance identifier. Similarly, the VNF manager 410 may use the unique VNF instance identifier when setting up a management session with a particular VNF instance 440 via a secure communication channel 418.

Each of the illustrative VNF instances 440 includes a VBS agent (i.e., a VBS agent 448 of the VNF (1) 442, a VBS agent 450 of the VNF (2) 444, and a VBS agent 452 of the VNF (N) 446) to securely bootstrap each of the VNF instances 440 to enable the VNF instances 440 to be provisioned securely, such as with a root credential. Further, each of the illustrative VNF instances is in secure network communication with the VBS 420 of the NFV security services controller 102 via a secure communication channel 424, as well as the operator infrastructure 460 (i.e., via secure communication channels 454, 456, 458).

As will be described in further detail below, each VBS agent 448, 450, 452 is configured to perform a secure bootstrap process (i.e., the execution of the secure VNF bootstrap capture protocol of FIGS. 9 and 10). To do so, each VBS agent 448, 450, 452 is configured to instantiate a previously spun-up VNF instance, create a public/private key pair (i.e., a public key and a private key) to be used for security in communicating with the NFV security services controller 102 when running the secure bootstrap process, and run the secure bootstrap process. It should be appreciated that, in some embodiments, the NFV infrastructure 108 may additionally include other VNF instances that do not include a VBS agent.

As described previously, the VNF instances 440 may bundle more than one VNF, such as may be required in a service function chain. In such embodiments, the secure bootstrap process can be used to bootstrap the entire service function chain. Additionally, in embodiments wherein the VNF instances 440 are factored along the control plane and the data plane, the secure bootstrap process can be utilized in a one to one, one to many, or many to many control plane and data plane VNF instances.

Figure 5:
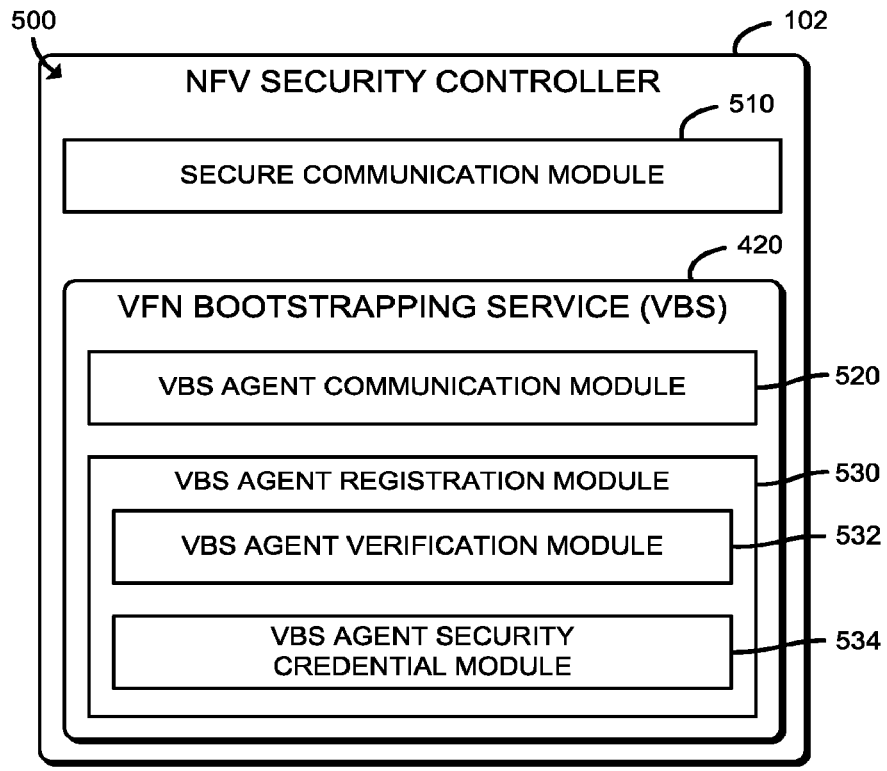
FIG. 5 is a simplified block diagram of at least one embodiment of an environment of the NFV security services controller of FIGS. 1 and 4.

Referring now to FIG. 5, in use, the NFV security services controller 102 establishes an environment 500 during operation. The illustrative environment 500 of the NFV security services controller 102 includes a secure communication module 510 and the VNF bootstrapping service 420 of FIG. 4. Additionally, the VNF bootstrapping service 420 includes a VBS agent communication module 520, a VBS agent registration module 530.

The various modules of the environment 500 may be embodied as hardware, firmware, software, or a combination thereof. For example, the various modules, logic, and other components of the environment 500 may form a portion of, or otherwise be established by hardware components of the NFV security services controller 102. As such, in some embodiments, any one or more of the modules of the environment 500 may be embodied as a circuit or collection of electrical devices (e.g., a secure communication circuit, a VBS agent communication circuit, and a VBS agent registration circuit, etc.). Additionally or alternatively, in some embodiments, one or more of the illustrative modules may form a portion of another module and/or one or more of the illustrative modules and/or submodules, which may be embodied as standalone or independent modules.

The secure communication module 510 is configured to facilitate secure communications (i.e., messages) between the NFV security services controller 102 and the various network processing components of the NFV network architecture 116. To do so, the secure communication module 510 is configured to secure communication paths between the NFV security services controller 102 and the various network processing components of the NFV network architecture 116 (e.g., the VIM 106, the VNF manager 410, etc.). Accordingly, in some embodiments, the secure communication module 510 may perform various key management functions, cryptographic functions, secure communication channel management, and/or other security functions. For example, the secure communication module 510 can be configured to secure the communication channel between the NFV security services controller 102 and the VNF manager 410 of FIG. 4 (e.g., the secure communication channel 412) using pairwise session keys that are refreshed periodically to ensure the security of communications between the NFV security services controller 102 and the VNF manager 410.

The VBS agent communication module 520, similar to the secure communication module 510, is configured to facilitate and manage secure communications (i.e., messages) between the VBS 420 and the VBS agents of the VNF instances 440 of the NFV infrastructure 108. The VBS agent registration module 530 is configured to register the VBS agents upon execution of the secure bootstrap process. To do so, the VBS agent registration module 530 includes a VBS agent verification module 532 and a VBS agent security credential module 534.

The VBS agent verification module 532 is configured to verify secure bootstrap parameters of the VBS agent (e.g., values and hashes). To do so, the VBS agent verification module 532 is be configured to verify an authenticity of a security quote received from a VBS agent during execution of the VBS capture protocol, which is described in further detail below. Additionally or alternatively, in some embodiments, the VBS agent verification module 532 may be configured to perform a whitelist check to verify a configuration of the VBS 420 based on one or more provisioning parameters received by the VBS 420, or the security controller 102, during a secure provisioning of the VBS 420. In some embodiments, the VBS agent verification module 532 may be additionally or alternatively configured to detect a liveness of the messages (i.e., that the messages have not expired, such as in a replay attack) between the VBS agent and the VBS 420 using a nonce session, which is also described further below. Additionally or alternatively, in some embodiments, the VBS agent verification module 532 may be configured to verify an authenticity of a public key of the VNF instance of the VBS agent, received from the VBS agent during execution of the VBS capture protocol.

The VBS agent security credential module 534 is configured to provide a valid security credential (e.g., a certificate, a signed hash result, etc.) for the VBS agent being registered during execution of the VBS capture protocol. To do so, the VBS agent security credential module 534 may be configured to create or retrieve a valid security credential in response to the VBS agent verification module 532 having verified the authenticity of the security quote and the public key of the VNF instance, as well as having validated the liveness of the messages (i.e., that the messages are not dead, such as in a replay attack).

Figure 6:
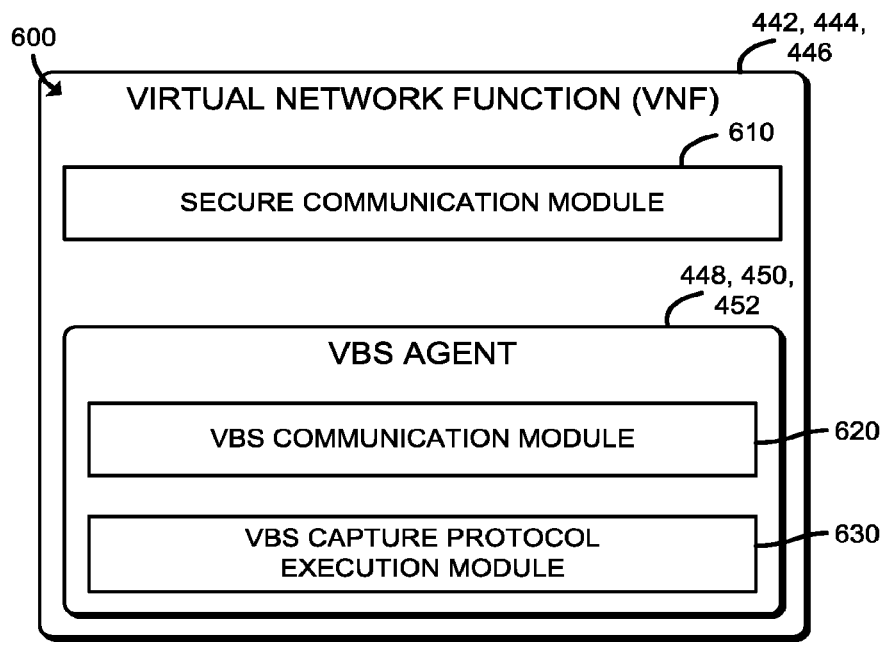
FIG. 6 is a simplified block diagram of at least one embodiment of an environment of a virtual network function (VNF) instance of the NFV network architecture of FIG. 4.

Referring now to FIG. 6, in use, each VNF instance (e.g., VNF instances 442, 444, 446 of FIG. 4) establishes an environment 600 during operation. The illustrative environment 600 of the corresponding VNF instance includes a secure communication module 610 and a VBS agent (e.g., one of the VBS agents 448, 450, 452 of FIG. 4). The illustrative VBS agent includes a VBS communication module 620 and a VBS capture protocol execution module 630 of the VBS agent. The various modules of the environment 600 may be embodied as hardware, firmware, software, or a combination thereof. For example, the various modules, logic, and other components of the environment 600 may form a portion of, or otherwise be established by hardware components of the NFV security services agent. As such, in some embodiments, any one or more of the modules of the environment 600 may be embodied as a circuit or collection of electrical devices (e.g., a secure communication circuit, VBS communication circuit, and a VBS capture protocol execution circuit, etc.). Additionally or alternatively, in some embodiments, one or more of the illustrative modules may form a portion of another module and/or one or more of the illustrative modules and/or submodules may be embodied as a standalone or independent module.

The secure communication module 610 is configured to facilitate the secure transmission of data (i.e., messages) to and from the VBS agent. The VBS communication module 620, similar to the secure communication module 610, is configured to facilitate and manage secure communications (e.g., registration data, verification data, configuration data, etc.) between the VBS agent and the VBS 420 of the NFV security services controller 102, such as during the secure bootstrap process. The VBS capture protocol execution module 630 is configured to execute the secure VNF bootstrap capture protocol, which is described in FIGS. 9 and 10. To do so, the VBS capture protocol execution module 630 is configured to create a public/private key pair (i.e., a public key and a private key) and request a security quote (e.g., an attestation quote, or a digitally signed value from which a TEE can be verified or authenticated), from a TEE of a platform on which the VNF instance is instantiated (e.g., the TEE 476 of the platform 472 of FIG. 4). Accordingly, the TEE can attest to the identity and configuration of the VBS agent (e.g., running correct VBS agent, configured by the correct launch parameters, the VBS agent generated the public key being requested. Additionally, remote attestation can be implemented to detect possible security threats, such as network packet tampering, network packet corruption, malicious content within network packets, etc.

Figure 7:
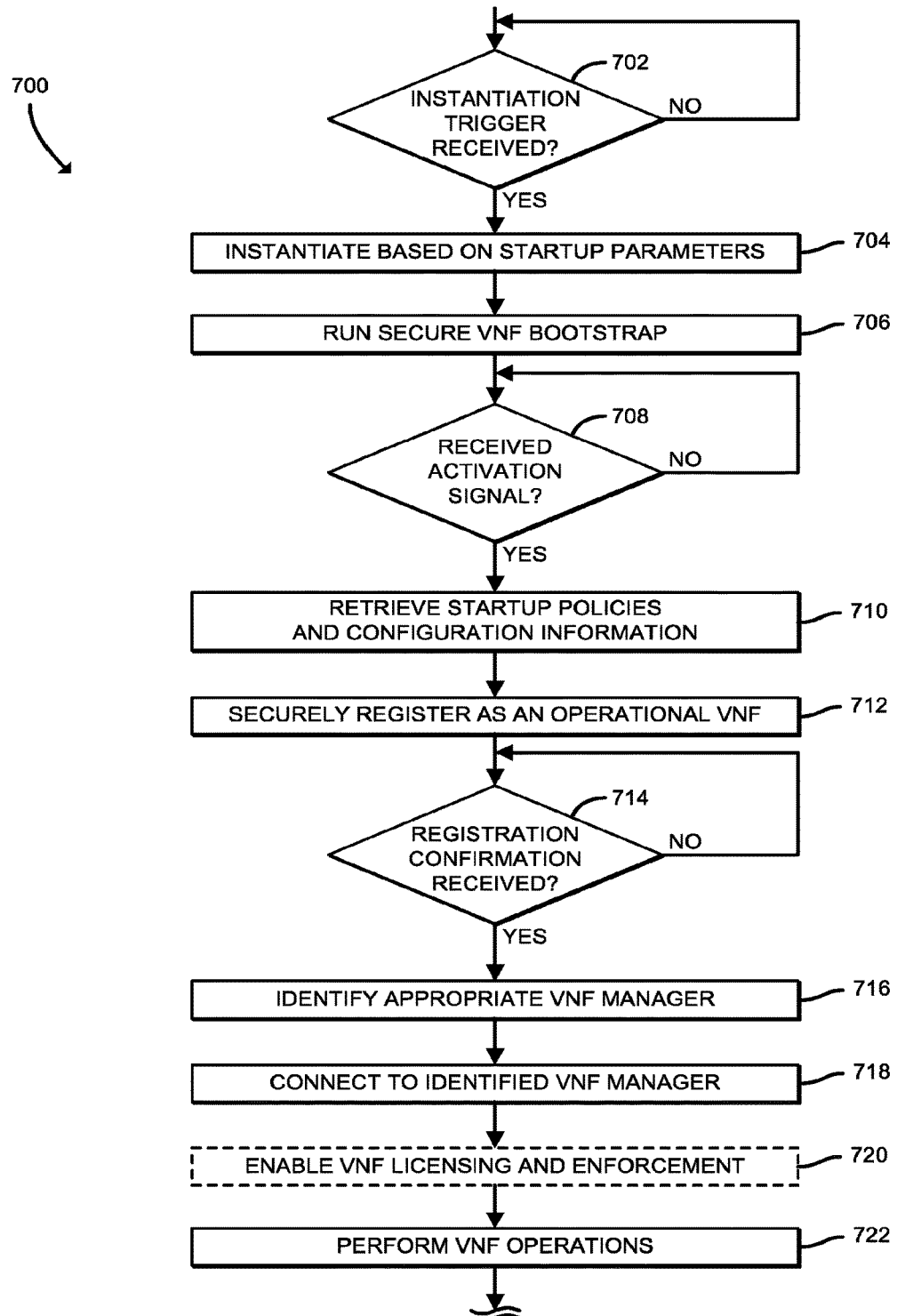
FIG. 7 is a simplified flow diagram of at least one embodiment of a method for initializing a secure VNF bootstrap that may be executed by the NFV security services controller of FIG. 5.

Referring now to FIG. 7, in use, a VNF instance (e.g., one of the VNF instances 440 of FIG. 4) may execute a method 700 for initializing a secure VNF bootstrap. The method 700 begins at block 702, in which the VNF instance determines whether an instantiation trigger was received, such as from the OSS/BSS 402 of FIG. 4. It should be appreciated that, in some embodiments, the instantiation may be automatically performed subsequent to the VNF instance being created. If not, the method 700 loops back to block 702 to continue to wait for the instantiation trigger to be received. If the instantiation trigger was received, the method advances to block 704. At block 704, the VNF instance instantiates based on a set of startup parameters (i.e., startup requirements). It should be appreciated that the instantiated VNF instance is not active (i.e., the VNF instance is not processing network traffic).

Figure 9:
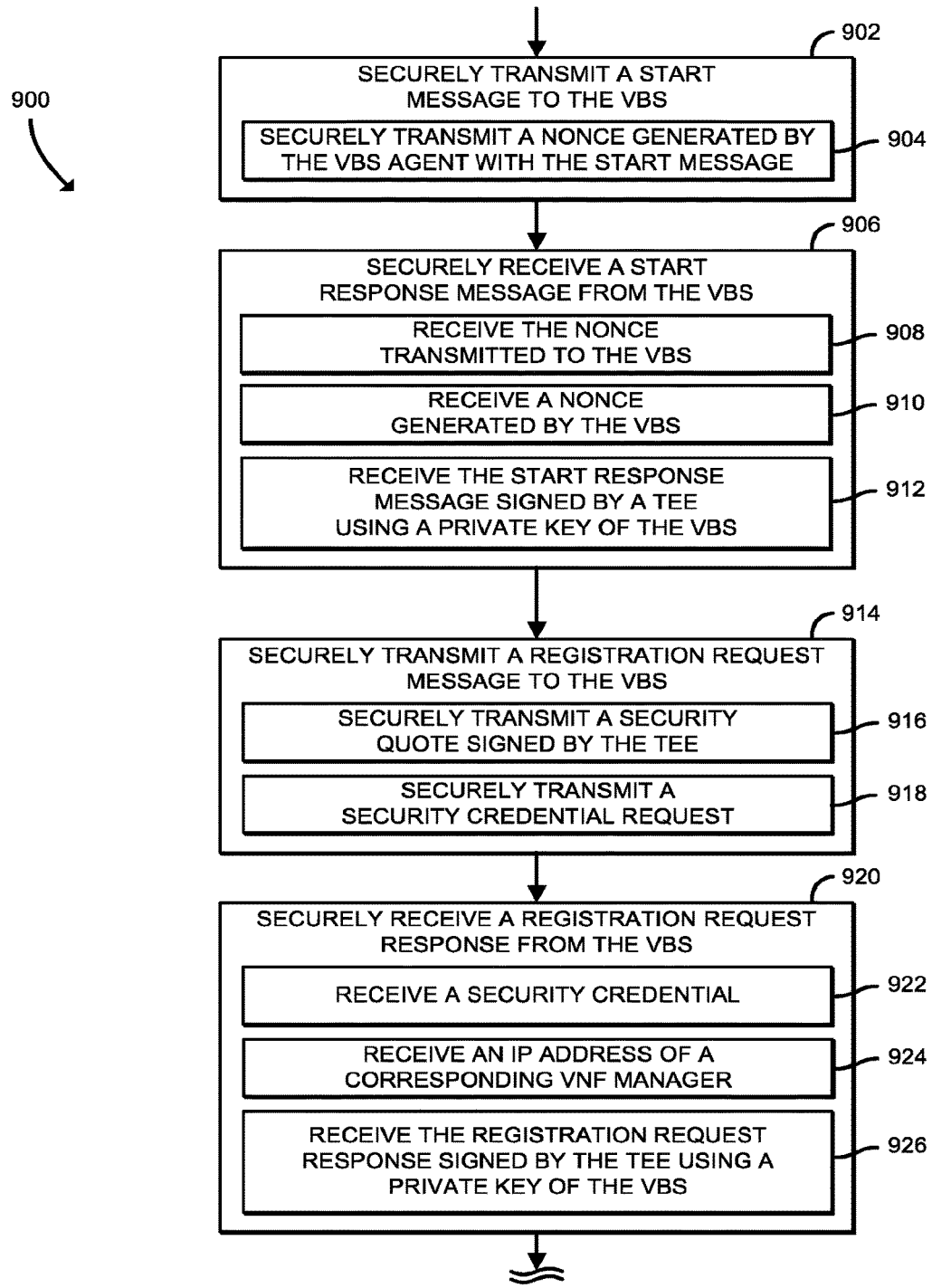
FIG. 9 is a simplified flow diagram of at least one embodiment of a method for executing a secure VNF bootstrap capture protocol that may be executed by a VNF bootstrap service (VBS) agent of the VNF instance of FIG. 6.
Figure 10:
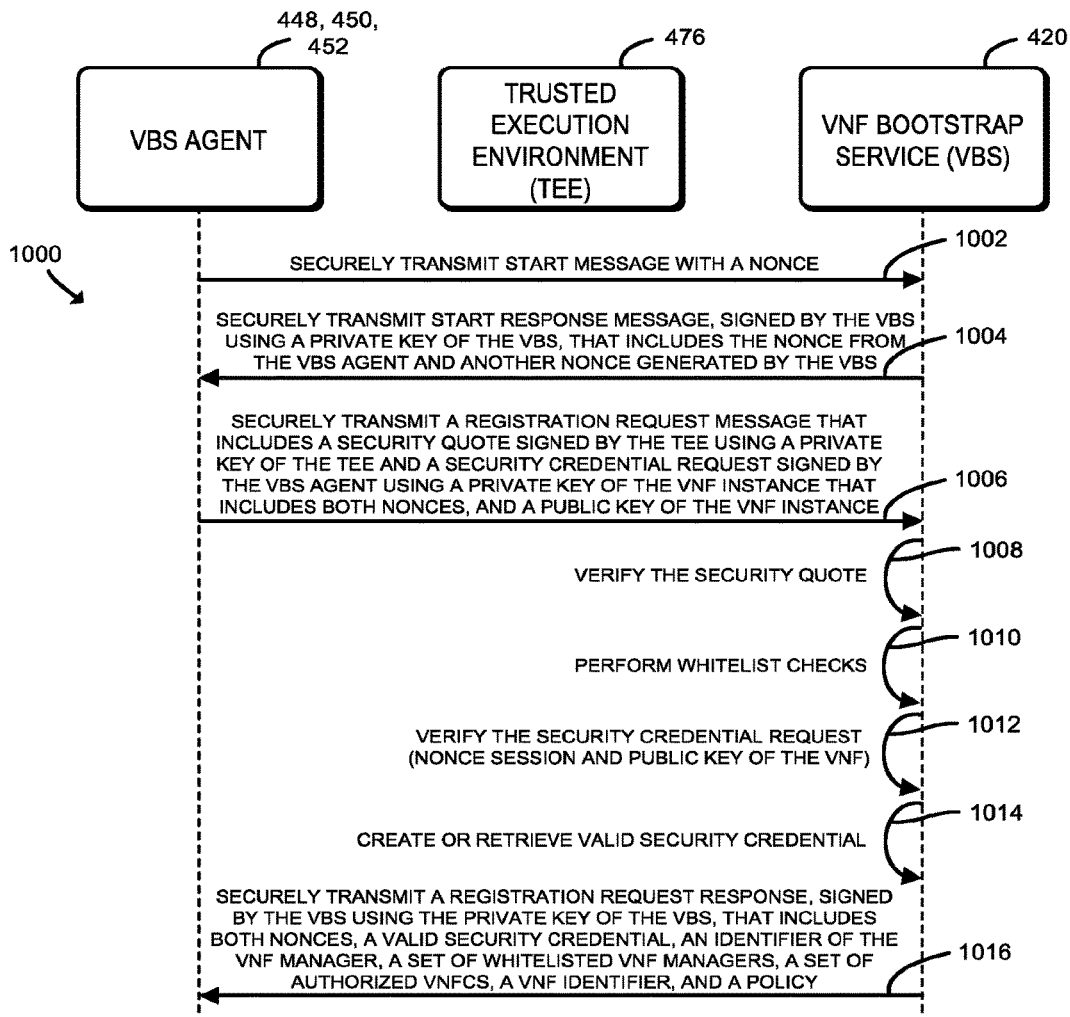
FIG. 10 is a simplified flow diagram of at least one embodiment of a communication flow for executing a secure VNF bootstrap capture protocol at one of the VNF instances of the NFV network architecture of FIG. 4.

At block 706, the VNF instance runs the secure VNF bootstrap capture protocol, which is described in further detail in FIGS. 9 and 10. At block 708, the VNF instance determines whether an activation signal was received, such as from the NFV security services controller 102 or the VNF manager 410, that indicates to activate the VNF instance (i.e., to start processing network traffic). If not, the method 700 loops back to block 708 to continue to wait for the activation signal to be received. If the activation signal was received, the method 700 advances to block 710. At block 710, the VNF instance retrieves startup policies and configuration information specific to the operation to be performed by the VNF instance.

At block 712, the VNF instance securely registers as an operational VNF instance. To do so, the VNF instance securely transmits a registration request message to the VBS 420. At block 714, the VNF instance determines whether a registration confirmation was received in response to the registration request message transmitted at block 712. If not, the method 700 loops back to block 714 to continue to wait for the registration confirmation. If the registration confirmation was received, the method 700 advances to block 716. At block 716, the VNF instance identifies a corresponding VNF manager (e.g., the VNF manager 410), such as by an IP address of the VNF manager, which may be received with the registration confirmation. It should be appreciated that, in some embodiments, multiple VNF managers may be present in the NFV network architecture 116. Accordingly, in such embodiments, the VNF manager that corresponds to the VNF instance may be identified by a unique identifier associated with that VNF manager, which may be provided to the VNF instance by the NFV security services controller 102. As such, in such embodiments, the VNF instance may request the unique identifier from the NFV security services controller 102 before advancing.

At block 718, the VNF instance connects to the identified VNF manager. Accordingly, the identified VNF manager can manage the lifecycle of the VNF instance (e.g., instantiate, update, query, scale, terminate, etc.). In some embodiments, at block 720, the VNF instance enables VNF licensing and enforcement. Accordingly, the licenses assigned to each of the VNF instances 440 can be tracked and enforced (e.g., by VNF vendors concerned with revenues generated by the VNF instances 440). To do so, in some embodiments, VNF license information (e.g., a license number, the unique VNF instance identifier, etc.) may be transmitted to the VNF manager, the NFV security services controller 102, and/or a dedicated license management server. At block 722, the VNF instance performs the operation (i.e., service or function) to which the VNF instance has been instantiated for.

Figure 8:
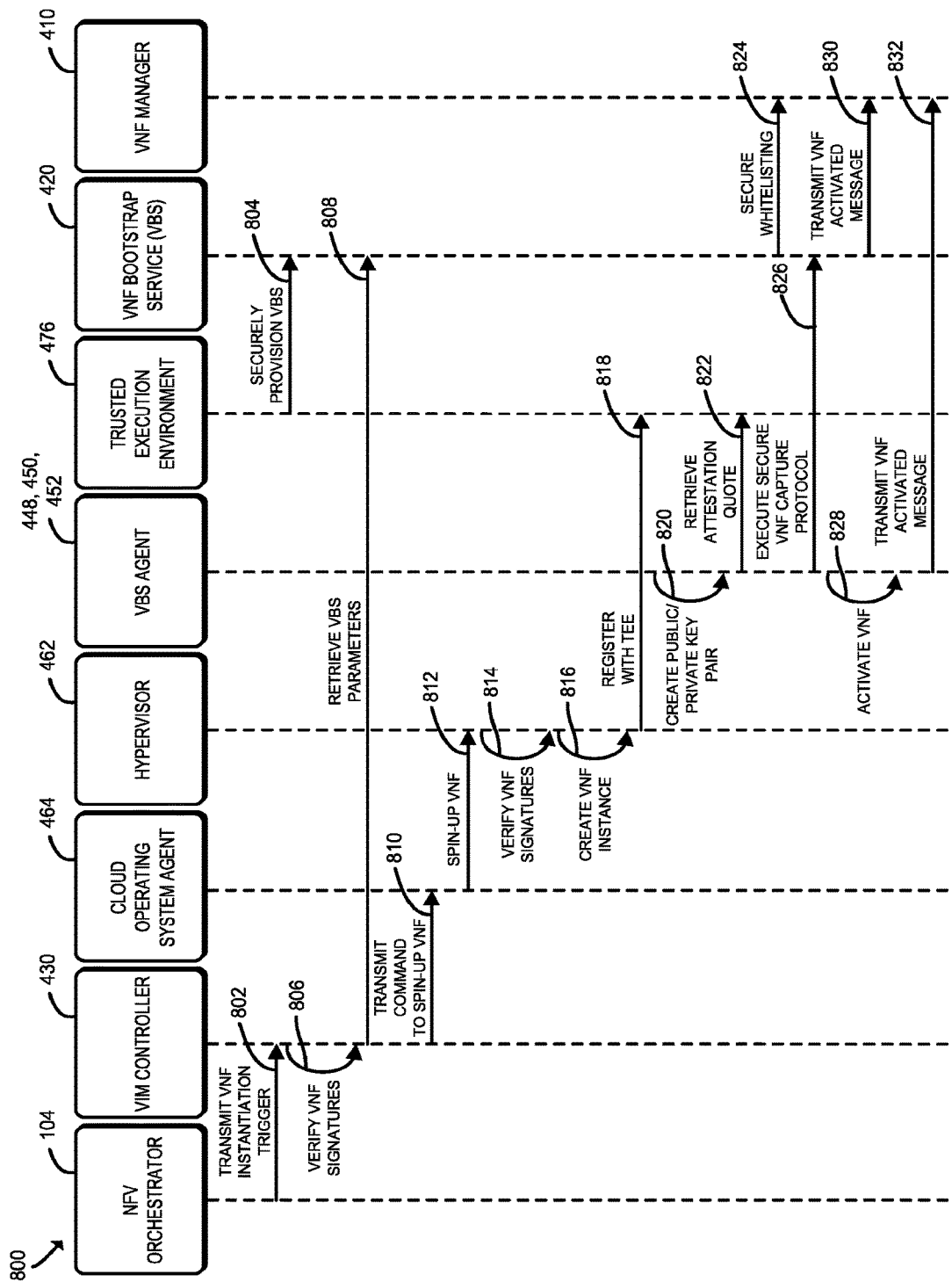
FIG. 8 is a simplified flow diagram of at least one embodiment of a communication flow for securely bootstrapping one of the VNF instances of the NFV network architecture of FIG. 4.

Referring now to FIG. 8, an embodiment of a communication flow 800 for securely bootstrapping a VNF instance (e.g., one of the VNF instances 440 of FIG. 4) of the NFV network architecture 116. The illustrative communication flow 800 includes the NFV orchestrator 104, the VIM controller 430 of the VIM 106, the cloud operating system agent 464 of the hypervisor 462, the hypervisor 462 of NFV infrastructure 108, one of the VBS agents of one of the VNF instances 440 (e.g., the VBS agent 448, the VBS agent 450, or the VBS agent 452), the TEE 476 of the platform 472, the VBS 420 of the NFV security services controller 102, and the VNF manager 410. The illustrative communication flow 800 additionally includes a number of message flows, some of which may be executed separately or together, depending on the embodiment.

At message flow 802, the NFV orchestrator 104 securely transmits a VNF instantiation trigger, received from the OSS/BSS 402, to the VIM controller 430. The VNF instantiation trigger can include signatures of a signed VNF image and a signed VNF descriptor. The signed VNF descriptor is a data structure that describes requirements and/or necessary elements of the VNF image, including startup parameters (i.e., startup requirements). At message flow 804, the TEE 476 securely provisions the VBS 420. To do so, the TEE 476 provides provisioning parameters and an identifier that is unique to the platform on which the VNF is to be instantiated (i.e., the unique platform identifier) to the security controller 102 on which the VBS resides. Accordingly, in some embodiments, the TEE 422 may be used to securely provision the VBS 420. The provisioning parameters include a public key of the VBS 420 and an identifier of the VBS 420, such as an IP address, a DNS, etc. As described previously, the unique platform identifier may be a combination hash, or GUID, of a hardware identifier, an OEM board identifier, a BIOS/UEFI SKU identifier, a FRU identifier, an operating system version identifier, etc. In some embodiments, the TEE 476 may securely provision the VBS 420 using out of band (OOB) communication technologies to transmit the public key of the VBS 420 and the VBS 420 identifier, as well as any other provisioning items that may be needed to securely provision the VBS 420.

At message flow 806, the VIM controller 430 verifies signatures of the information received with the VNF instantiation trigger, such as the signed VNF descriptor and the signed VNF image. In some embodiments, the signed VNF image may include more than one signed VNF images. In such embodiments, the more than one signed VNF images may be stitched and signed again as a group of VNF images, or delivered as separate, signed VNF images. Accordingly, each signature associated with the signed VNF image is verified at the VIM controller 430.

At message flow 810, the VIM controller 430 securely transmits a command to spin-up a VNF instance based on the VNF image and descriptor. The spin-up command additionally includes a set of VBS parameters (i.e., details of the VBS 420), which may include the public key of the VBS 420, the IP address of the VBS 420, a domain name server (DNS) of the VBS 420, a fully qualified domain name (FQDN) of the VBS 420, a uniform resource locator (URL) of the VBS 420, and/or the like.

At message flow 812 the hypervisor 462 spins up a VNF instance (e.g., one of the VNF instances 440) based on the signed VNF image and the signed VNF descriptor. To do so, the hypervisor 462 verifies the VNF signatures (e.g., signatures of the signed VNF image, the signed VNF descriptor, etc.) at message flow 814 and creates a VNF instance at message flow 816. At message flow 818, the hypervisor 462 registers with the TEE 476. To do so, the hypervisor 462 securely transmits an identifier unique to the created VNF instance. The unique VNF instance identifier may be a combination hash, or a GUID, of a VNF image instance identifier, a VNF descriptor identifier, a composition of VNFC identifiers, a VNF command line identifier, and VNF OEM identifier, a VNF vendor identifier, etc. Additionally, the hypervisor 462 may securely transmit configuration information of the VNF instance.

At message flow 820, the VBS agent creates a public/private key pair (i.e., a public key and a private key) for the VNF instance. At message flow 822, the VBS agent retrieves a security quote from the TEE 476. Accordingly, remote attestation can be implemented to detect possible security threats, such as network packet tampering, network packet corruption, malicious content within network packets, etc. To do so, the VBS agent may securely transmit VNF identification information, such as the unique platform identifier, the unique VNF instance identifier, etc., to the TEE 476.

At message flow 824, the VBS 420 performs a secure whitelisting with the VNF manager 410. In other words, the VBS 420 adds the VNF instance to the list or register of recognized (i.e., privileged or otherwise approved) VBS agents to be managed by the VNF manager 410. To do so, the VBS 420 may securely transmit VNF identification information (e.g., the unique VNF instance identifier) to the VNF manager 410 and one or more VBS parameters (e.g., the IP address of the VBS 420, the DNS of the VBS 420, etc.).

At message flow 826, the VBS agent executes the secure VNF bootstrap capture protocol, which is shown in FIGS. 9 and 10. At message flow 828, the VBS agent activates the VNF instance. In other words, network traffic processing is enabled at the VNF instance. At message flow 830, the VBS 420 securely transmits a VNF activated message, including the unique VNF instance identifier, to the VNF manager 410 to indicate that the VNF instance is now active. Similarly, at message flow 832, the VBS agent securely transmits a VNF activated message to the VNF manager 410 to indicate that the VNF instance has been activated. Accordingly, the VNF activated message includes the unique VNF instance identifier.

Referring now to FIG. 9, in use, a VBS agent (e.g., the VBS agent 448, the VBS agent 450, or the VBS agent 452 of FIG. 4) may execute a method 900 for executing a secure VNF bootstrap capture protocol. The method 900 begins at block 902, in which the VBS agent securely transmits a start message to the VBS 420. The start message may be embodied as any type of message that informs the VBS 420 that the respective VBS agent has initiated. At block 904, the VBS agent securely transmits the start message with a nonce (e.g., a random challenge issued by the VBS agent to detect replays at the VBS 420) generated by the VBS agent to be used for secure authentication. At block 906, the VBS agent securely receives a start response message from the VBS 420. At block 908, the VBS agent receives the nonce transmitted with the start message at block 904 as part of the start response message. Additionally, at block 910, the VBS agent receives a nonce generated by the VBS 420 as part of the start response message. Accordingly, a liveness detection may be performed on the start response message to prove liveness of the response. Further, at block 912, the VBS agent receives the start response message signed by the VBS 420 using a private key of the VBS 420.

At block 914, the VBS agent securely transmits a registration request message to the VBS 420. To do so, at block 916, the VBS agent securely transmits a security quote signed by the TEE 476, using a private key of the TEE 476, as part of the registration request message. The security quote, the calculation of which is described in further detail below, is a digitally signed value from which a receiver of the security quote can authenticate the transmitter of the digitally signed value. Accordingly, remote attestation can be implemented to detect possible security threats, such as network packet tampering, network packet corruption, malicious content within network packets, etc. Additionally, at block 918, the VBS agent securely transmits a security credential request, signed by the VBS agent using a private key of the VNF, to request a security credential (e.g., a certificate, a signed hash result, etc.) as part of the registration request message. In some embodiments, the security credential request may include each of the nonces generated at the VBS 420 and the VBS agent, and a public key of the VNF instance. Additionally or alternatively, in some embodiments, the certification request may also include a quote signed by the TEE 476 using the private key of the TEE 476.

At block 920, the VBS agent securely receives a registration request message response from the VBS 420. At block 922, the registration request message response received by the VBS agent includes a valid security credential. Additionally, at block 924, the registration request message response received by the VBS agent includes an IP address of a corresponding VNF manager (e.g., the VNF manager 410 of FIG. 4). At block 926, the registration request message response received by the VBS agent is signed by the VBS 420 using the private key of the VBS 420.

Referring now to FIG. 10, an embodiment of a communication flow 1000 for executing a secure VNF bootstrap capture protocol by a VBS agent (e.g., the VBS agent 448, the VBS agent 450, or the VBS agent 452 of FIG. 4). The illustrative communication flow 1000 includes one of the VBS agents of one of the VNF instances 440 (e.g.), the TEE 476 of the platform 472, and the VBS 420 of the NFV security services controller 102. The illustrative communication flow 1000 additionally includes a number of message flows, some of which may be executed separately or together, depending on the embodiment.

At message flow 1002, the VBS agent securely transmits a start message that includes a nonce (e.g., an arbitrary number for authentication) to the VBS 420. At message flow 1004, the VBS 420 securely transmits a start response message to the VBS agent that includes the nonce from the VBS agent and another nonce (e.g., another arbitrary number for authentication). Further, the start response message is signed by the VBS 420 using a private key of the VBS 420. At message flow 1006, the VBS agent securely transmits a registration request message to the VBS 420. The registration request message includes a security quote (see FIG. 11) signed by the TEE 476 using the private key signed by the TEE 476. The registration request message additionally includes a security credential request that includes the both the nonce from the VBS agent and the nonce from the VBS 420, as well as the public key of the VNF instance on which the VBS agent is initialized. Further, the security credential request is signed by the VBS agent using the private key of the VNF instance. The security quote, calculated and signed by the TEE 476, is the result of a TEE quoting operation, which is described in further detail in FIG. 11.

At message flow 1008, the VBS 420 verifies the security quote signed by the TEE 476 that was received from the VBS agent. At message flow 1010, the VBS 420 performs a series of whitelist checks to verify that the VBS 420 is configured correctly. Accordingly, in some embodiments, the VBS 420 may perform the whitelist checks by verifying the provisioning parameters sent by the TEE 476 that were used to securely provision the VBS 420 (see message flow 804). Additionally or alternatively, in some embodiments, the VBS 420 may perform the whitelist checks by verifying that the unique platform identifier received is valid with respect to a security policy (e.g., a secure boot policy, a TPM policy, a versioning policy, etc.) of the platform on which the TEE that provisioned the VBS 420 was instantiated. Additionally, in some embodiments, VBS 420 may perform the whitelist checks b checking the validity of additional policies, such as for license validity checks (e.g., based on the unique VNF instance identifier). Further, in some embodiments, the VBS 420 may additionally or alternatively verify whether the VBS agent is approved to communicate with the VBS 420 as part of the whitelist checks, such as by verifying that the VBS agent has been registered with the VBS 420.

At message flow 1012, the VBS 420 verifies the security credential request by verifying the nonce session and the public key of the VNF instance received from the VBS agent. To do so, the VBS 420 performs a liveness check to detect any delayed or replay attacks using session nonces (i.e., the nonce generated by the VBS agent and the nonce generated by the VBS 420). The session nonces can be random numbers used to detect attacks, the values of which are stored associated with the flow corresponding to the messages transmitted therebetween. Accordingly, the session nonces can be check for each flow to detect a liveness (i.e., that the session has not expired) of the communicated messages, as well as to distinguish between multiple flows that the VBS 420 may be executing.

At message flow 1014, the VBS 420 creates or retrieves a valid security credential (e.g., a security certificate, a signed hash result, etc.) upon verification of the security credential request. It should be appreciated that the message flows 1008 through 1014 may be performed in any order, however, in some embodiments, a local security policy may be used by the VBS 420 that provides a timeline for session expiration. Accordingly, the order of the performance of the message flows 1008 through 1014 may be based on the number of sessions currently active, or being buffered, by the VBS 420, computing resources available to the VBS, session time expiration constraints, etc.

At message flow 1016, the VBS 420 securely transmits a registration response message to the VBS agent. The registration response message includes the nonce generated by the VBS agent, the nonce generated by the VBS 420, a valid security credential, an identifier of the VNF manager 410 (e.g., an IP address, a DNS, a FQDN, a URL, etc.) responsible for managing the VBS agent, a set of whitelisted VNF managers, a set of authorized VNFCs (if applicable), the unique VNF instance identifier, and one or more policies. The one or more policies may include any type of policy that provides direction, or instruction, to the VBS agent on how to perform a particular service or function, such as a security monitoring policy, a networking policy, a network packet processing policy, etc. Additionally, the registration request message response is signed by the VBS using the private key of the VBS 420. It should be appreciated that, in some embodiments, the registration response message may include additional and/or alternative parameters.

It should be appreciated that, in some embodiments, the security quote may be extensible, for instance to include additional and/or alternative information to support additional components of the platform on which the VNF instance is instantiated. For example, the additional information may include a platform capabilities mask, a platform NIC and/or switch mask, service function chaining (SFC) policies for a platform, a list of security credential identifiers, etc. Accordingly, unlike traditional operator cloud networks using static images in unsecure and non-scalable environments, the dynamic nature of the secure VNF bootstrap capture protocol may reduce the amount of, or need for, static configuration and security options, which may allow for more dynamic scaling out/in of virtualized operator cloud networks.

Figure 11:
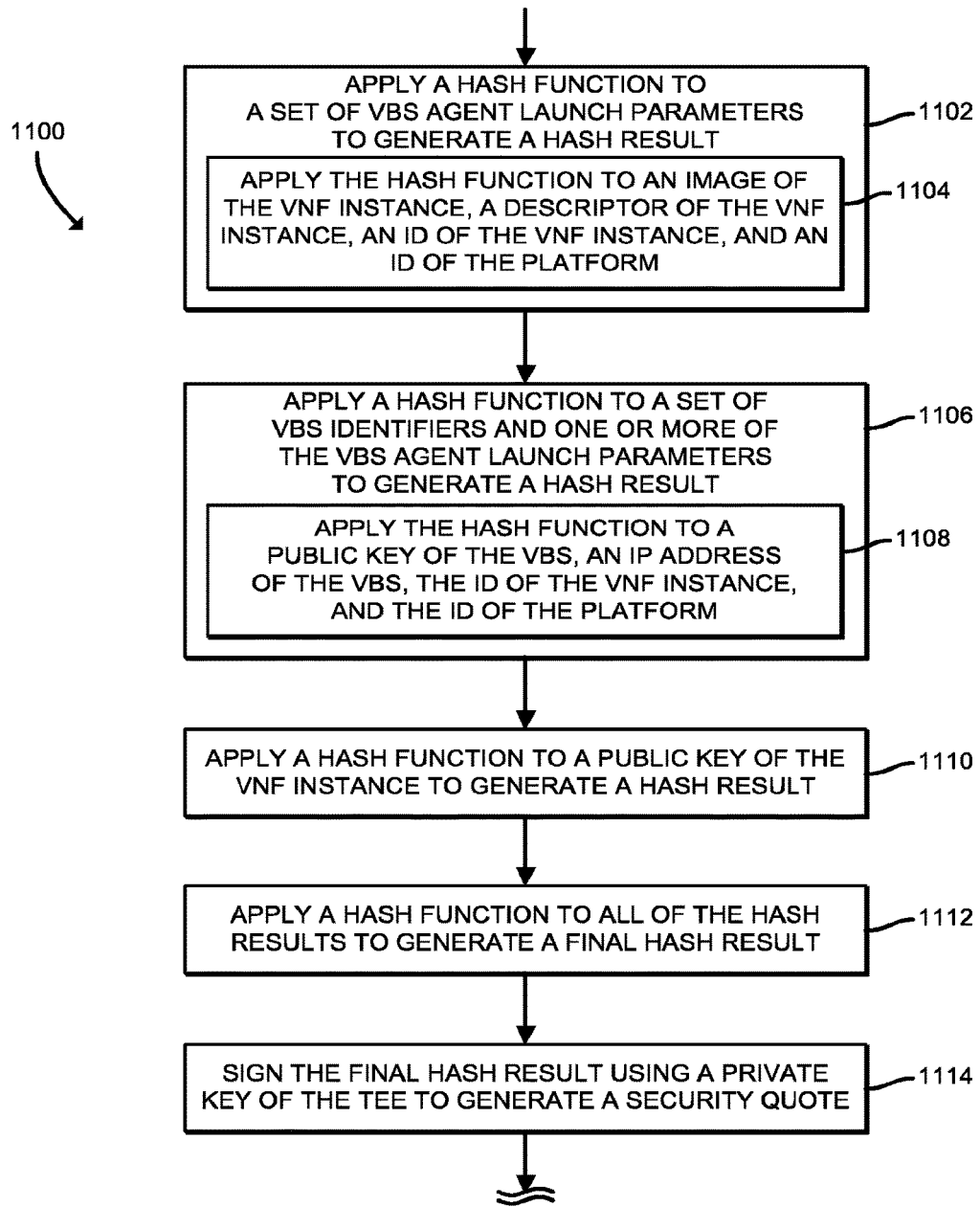
FIG. 11 is a simplified flow diagram of at least one embodiment of a method for performing a TEE quoting operation that may be executed by a trusted execution environment (TEE) of one of the platforms of the NFV network architecture of FIG. 4.

Referring now to FIG. 11, in use, a trusted execution environment (e.g., the TEE 476 of FIG. 4) may execute a method 1100 for performing a TEE quoting operation for a VBS agent (e.g., the VBS agent 448, the VBS agent 450, or the VBS agent 452 of FIG. 4). The method 1100 begins at block 1102, in which the TEE applies a hash function to a set of launch parameters of the VBS agent to generate a hash result. The launch parameters may include any parameters that may be used to launch an instance of the VNF and/or the VBS agent. To do so, at block 1104, the TEE applies the hash function to an image of a VNF instance, a descriptor of the VNF instance, an identifier unique to the VNF instance (i.e., a unique VNF instance identifier), and/or an identifier that is unique to a platform (i.e., a unique platform identifier) on which the VNF instance is instantiated to generate a hash result. Accordingly, the TEE can apply the first hash function when it loads the VNF, since all of the VNF launch parameters are known by the TEE in order to launch the VNF. In other words, the TEE can apply the first hash function without receiving any inputs from the VBS agent.

At block 1106, the TEE applies a hash function to a set of VBS identifiers of the VBS 420 and one or more of the VBS agent launch parameters to generate a second hash result. The set of VBS identifiers may include any information that may be used to identify the VBS 420, such as a public key of the VBS 420, an IP address of the VBS 420, a DNS of the VBS 420, a FQDN of the VBS 420, a URL of the VBS 420, and/or the like. To do so, at block 1108, the TEE applies the hash function to the public key of the VBS 420, the IP address of the VBS 420, the unique VNF instance identifier, the unique platform identifier. In some embodiments, another hash function may be applied to the set of VBS identifiers of the VBS 420 prior to applying the hash function at block 1106. Additionally or alternatively, in some embodiments, the hash result of the hash function applied at block 1102 may additionally be included as an input in the hash function applied at block 1106.

At block 1110, the TEE applies a hash function to a public key of the VNF instance to generate a hash result. It should be appreciated that, in some embodiments, the hash result of the hash function applied at block 1106 may additionally be included as an input in the hash function applied at block 1110. Similar to the first hash function, the TEE can apply the hash function of block 1106 without having received any input from the VBS agent. At block 1112, the TEE applies a hash function to all of the hash results of blocks 1102, 1106, and 1110 to generate a final hash result. At block 1114, the TEE signs the final hash result using a private key of the TEE to generate the security quote.

EXAMPLES

Illustrative examples of the technologies disclosed herein are provided below. An embodiment of the technologies may include any one or more, and any combination of, the examples described below.

Example 1 includes a virtual network function (VNF) bootstrap service (VBS) agent of a VNF instance for bootstrapping virtual network functions in a network functions virtualization (NFV) network architecture, the VBS agent comprising a VBS capture protocol execution module to (i) transmit a start message to a VBS of the NFV network architecture, wherein the VBS is communicatively coupled to the VBS agent, and wherein the start message provides an indication that the VBS agent is instantiated, (ii) receive a start response message from the VBS in response to transmission of the start message, (iii) transmit a registration request message to the VBS in response to receiving the start response message, wherein the registration request message includes a security quote usable to authenticate the VBS agent as the transmitter of the registration request message and a security credential request to request a security credential from the VBS, and (iv) receive a registration response message from the VBS, wherein the registration response message includes a security credential that indicates that the security quote and the security credential request have been validated by the VBS.

Example 2 includes the subject matter of Example 1, and wherein the start message includes a first nonce, the start response message is signed by the VBS using a private key of the VBS and includes the first nonce and a second nonce generated by the VBS, the security credential request is signed by the VNF instance using a private key of the VNF instance and includes the first nonce, the second nonce, and a public key of the VNF instance, the registration response message is signed by the VBS using a private key of the VBS and further includes the first nonce, the second nonce, an identifier of a VNF manager responsible for managing the VBS agent, a set of VNF managers that are whitelisted, a set of VNF components (VNFCs) authorized by the VBS, a unique VNF instance identifier, and one or more policies, and the policy includes instructions usable by the VBS agent to perform a particular function.

Example 3 includes the subject matter of any of Examples 1 and 2, and wherein the VBS capture protocol execution module is further to retrieve the security quote signed by a trusted execution environment (TEE) using a private key of the TEE, wherein the TEE is located on a platform on which the VNF instance is instantiated.

Example 4 includes the subject matter of any of Examples 1-3, and wherein the VBS capture protocol execution module is further to (i) receive an instantiation trigger from an NFV orchestrator of the NFV network architecture, and (ii) initialize the VBS agent, wherein to transmit the start message comprises to transmit the start message in response to receiving the instantiation trigger.

Example 5 includes the subject matter of any of Examples 1-4, and wherein to initialize the VBS agent comprises to (i) create a public/private key pair of the VNF instance, wherein the public/private key pair of the VNF instance includes a public key and a private key, and (ii) retrieve the security quote, from a trusted execution environment (TEE) of a platform on which the VNF instance was created, wherein the security quote is signed by the TEE using a private key of the TEE Example 6 includes the subject matter of any of Examples 1-5, and wherein the VBS capture protocol execution module is further to (i) generate the security credential request and (ii) sign the security credential request using the private key of the VNF instance in response to having received the start response message from the VBS.

Example 7 includes the subject matter of any of Examples 1-6, and wherein the VBS capture protocol execution module is further to activate the VNF instance to actively process network traffic received by the VNF instance in response to having received the security credential.

Example 8 includes the subject matter of any of Examples 1-7, and wherein the VBS capture protocol execution module is further to transmit an indication to a VNF manager of the NFV network architecture that indicates to the VNF manager that (i) the VNF instance is active and (ii) the configuration of the VNF instance is to be managed by the VNF manager, wherein the indication includes a VNF instance identifier that is unique to the VNF instance and usable to add the VNF instance to a whitelist of authorized VNF instances at the VNF manager.

Example 9 includes the subject matter of any of Examples 1-8, and wherein to receive the registration response message from the VBS further comprises to receive an identifier of a VNF manager that is communicatively coupled to the VBS agent.

Example 10 includes the subject matter of any of Examples 1-9, and wherein to receive the identifier of the VNF manager comprises to receive at least one of an internet protocol (IP) address, a domain name server (DNS), a fully qualified domain name (FQDN), a uniform resource locator (URL).

Example 11 includes the subject matter of any of Examples 1-10, and wherein the VBS capture protocol execution module is further to connect to the VNF manager using the identifier of the VNF manager in response to receiving the identifier of the VNF manager.

Example 12 includes the subject matter of any of Examples 1-11, and wherein the VBS capture protocol execution module is further to transmit VNF license information to the VNF manager in response to having received the identifier of the VNF manager, wherein the VNF license information includes information usable to track usage of a license associated with the VNF instance.

Example 13 includes a method for bootstrapping virtual network functions in a network functions virtualization (NFV) network architecture, the method comprising transmitting, by a VNF bootstrap service (VBS) agent of a VNF instance of the NFV network architecture, a start message to a VBS of the NFV network architecture communicatively coupled to the VBS agent, wherein the start message provides an indication that the VBS agent is instantiated; receiving, by the VBS agent and in response to the start message, a start response message from the VBS; transmitting, by the VBS agent, a registration request message to the VBS in response to receiving the start response message, wherein the registration request message includes a security quote usable to authenticate the VBS agent as the transmitter of the registration request message and a security credential request to request a security credential from the VBS; and receiving, by the VBS agent, a registration response message from the VBS, wherein the registration response message includes a security credential that indicates each of the security quote and the security credential request have been validated by the VBS.

Example 14 includes the subject matter of Example 13, and wherein transmitting the start message comprises transmitting a first nonce, receiving the start response message comprises receiving the start response message signed by the VBS using a private key of the VBS and includes the first nonce and a second nonce generated by the VBS, transmitting the security credential request comprises transmitting the security credential request signed by the VNF instance using a private key of the VNF instance and includes the first nonce, the second nonce, and a public key of the VNF instance, receiving the registration response message comprises receiving the registration response message signed by the VBS using a private key of the VBS and further includes the first nonce, the second nonce, an identifier of a VNF manager responsible for managing the VBS agent, a set of VNF managers that are whitelisted, a set of VNF components (VNFCs) authorized by the VBS, a unique VNF instance identifier, and one or more policies, and the policy includes instructions usable by the VBS agent to perform a particular function.

Example 15 includes the subject matter of any of Examples 13 and 14, and further including retrieving, by the VBS agent, the security quote signed by a trusted execution environment (TEE) using a private key of the TEE, wherein the TEE is located on a platform on which the VNF instance is instantiated.

Example 16 includes the subject matter of any of Examples 13-15, and further including receiving, by the VBS agent, an instantiation trigger from an NFV orchestrator of the NFV network architecture; and initializing the VBS agent, wherein transmitting the start message comprises transmitting the start message in response to receiving the instantiation trigger.

Example 17 includes the subject matter of any of Examples 13-16, and wherein initializing the VBS agent comprises (i) creating a public/private key pair, wherein the public/private key pair of the VNF instance includes a public key and a private key, and (ii) retrieving the security quote from a trusted execution environment (TEE) of a platform on which the VNF instance was created, wherein the security quote is signed by the TEE using a private key of the TEE.

Example 18 includes the subject matter of any of Examples 13-17, and further including generating the security credential request; and signing the security credential request using a private key of the VNF instance in response to having received the start response message from the VBS.

Example 19 includes the subject matter of any of Examples 13-18, and further including activating the VNF instance to actively process network traffic received by the VNF instance in response to receiving the security credential.

Example 20 includes the subject matter of any of Examples 13-19, and further including transmitting an indication to a VNF manager of the NFV network architecture that indicates to the VNF manager that (i) the VNF instance is active and (ii) the configuration of the VNF instance is to be managed by the VNF manager, wherein the indication includes a VNF instance identifier that is unique to the VNF instance and usable to add the VNF instance to a whitelist of authorized VNF instances at the VNF manager.

Example 21 includes the subject matter of any of Examples 13-20, and wherein receiving the registration response message from the VBS further comprises receiving an identifier of a VNF manager that is communicatively coupled to the VBS agent.

Example 22 includes the subject matter of any of Examples 13-21, and wherein receiving the identifier of the VNF manager comprises receiving at least one of an internet protocol (IP) address, a domain name server (DNS), a fully qualified domain name (FQDN), a uniform resource locator (URL).

Example 23 includes the subject matter of any of Examples 13-22, and further including connecting to the VNF manager using the identifier of the VNF manager in response to receiving the identifier of the VNF manager.

Example 24 includes the subject matter of any of Examples 13-23, and further including transmitting VNF license information to the VNF manager in response to having received the identifier of the VNF manager, wherein the VNF license information includes information usable to track usage of a license associated with the VNF instance.

Example 25 includes a computing device comprising a processor; and a memory having stored therein a plurality of instructions that when executed by the processor cause the computing device to perform the method of any of Examples 13-24.

Example 26 includes one or more machine readable storage media comprising a plurality of instructions stored thereon that in response to being executed result in a computing device performing the method of any of Examples 13-24.

Example 27 includes a virtual network function (VNF) bootstrap service (VBS) agent of a VNF instance of a network functions virtualization (NFV) network architecture for bootstrapping virtual network functions in the NFV network architecture, the method comprising means for transmitting a start message to a VBS of the NFV network architecture communicatively coupled to the VBS agent, wherein the start message provides an indication that the VBS agent is instantiated; means for receiving, in response to the start message, a start response message from the VBS; means for transmitting a registration request message to the VBS in response to receiving the start response message, wherein the registration request message includes a security quote usable to authenticate the VBS agent as the transmitter of the registration request message and a security credential request to request a security credential from the VBS; and means for receiving a registration response message from the VBS, wherein the registration response message includes a security credential that indicates each of the security quote and the security credential request have been validated by the VBS.

Example 28 includes the subject matter of Example 27, and wherein the means for transmitting the start message comprises means for transmitting a first nonce, the means for receiving the start response message comprises means for receiving the start response message signed by the VBS using a private key of the VBS and includes the first nonce and a second nonce generated by the VBS, the means for transmitting the security credential request comprises means for transmitting the security credential request signed by the VNF instance using a private key of the VNF instance and includes the first nonce, the second nonce, and a public key of the VNF instance, the means for receiving the registration response message comprises means for receiving the registration response message signed by the VBS using a private key of the VBS and further includes the first nonce, the second nonce, an identifier of a VNF manager responsible for managing the VBS agent, a set of VNF managers that are whitelisted, a set of VNF components (VNFCs) authorized by the VBS, a unique VNF instance identifier, and one or more policies, and the policy includes instructions usable by the VBS agent to perform a particular function.

Example 29 includes the subject matter of Examples 27 and 28, and wherein the means for receiving the registration response message from the VBS further comprises means for receiving an identifier of a VNF manager that is communicatively coupled to the VBS agent.

Example 30 includes the subject matter of Examples 27-29, and further including means for connecting to the VNF manager using the identifier of the VNF manager in response to receiving the identifier of the VNF manager.

Example 31 includes the subject matter of Examples 27-30, and further including means for transmitting VNF license information to the VNF manager in response to having received the identifier of the VNF manager, wherein the VNF license information includes information usable to track usage of a license associated with the VNF instance.

Example 32 includes a virtual network function (VNF) bootstrap service (VBS) of a network functions virtualization (NFV) network architecture method for bootstrapping virtual network functions in the NFV network architecture, the VBS comprising a VBS agent communication module to (i) receive a start message from a VBS agent of a VNF instance of the NFV network architecture that is communicatively coupled to the VBS, wherein the start message provides an indication that the VBS agent has been instantiated, (ii) transmit a start response message to the VBS agent in response to receiving the start message, (iii) receive a registration request message from the VBS agent in response to transmitting the start response message, wherein the registration request message includes a security quote and a security credential request to request a security credential from the VBS, (iv) validate, in response to having received the security credential request of the registration request message, the security quote to authenticate the VBS agent as the transmitter of the registration request message, and (v) transmit, in response to validating the security quote, a registration response message to the VBS agent, wherein the registration response message includes a security credential that indicates the security quote has been validated by the VBS.

Example 33 includes the subject matter of Example 32 to receive the start message comprises to receive a first nonce, to transmit the start response message comprises to transmit the start response message signed by the VBS using a private key of the VBS, wherein the start response message includes the first nonce and a second nonce generated by the VBS, and to receive the security credential request comprises to receive the security credential request signed by the VNF instance using a private key of the VNF instance, wherein the security credential request includes the first nonce, the second nonce, and a public key of the VNF instance.

Example 34 includes the subject matter of Examples 32 and 33, wherein to transmit the registration response message comprises to transmit the registration response message signed by the VBS using a private key of the VBS, wherein the registration response message further includes the first nonce, the second nonce, an identifier of a VNF manager responsible for managing the VBS agent, a set of VNF managers that are whitelisted, a set of VNF components (VNFCs) authorized by the VBS, a unique VNF instance identifier, and one or more policies, and wherein the one or more policies include instructions usable by the VBS agent to perform a particular function.

Example 35 includes the subject matter of Examples 32-34, and wherein the VBS agent communication module is further to receive a set of provisioning parameters from a trusted execution environment (TEE) of a platform on which the VNF instance was created, wherein the provisioning parameters are usable to securely provision the VBS and include (i) a platform identifier unique to the platform on which the VNF instance was created, (ii) a public key of the VBS, and (iii) a unique identifier of the VBS, and provision the VBS based on the provisioning parameters.

Example 36 includes the subject matter of Examples 32-35, and further including a VBS agent verification module to (i) verify, in response to receiving the registration request message, an authenticity of the security quote based on a private key of the TEE, wherein the security quote was signed using the private key of the TEE, (ii) perform a whitelist check to verify a configuration of the VBS, (iii) detect a liveness of the registration request message using the first and second nonce to ensure the first and second nonce have not expired, and (iv) verify an authenticity of the public key of the VNF instance.

Example 37 includes the subject matter of Examples 32-36, and wherein to perform the whitelist check comprises to verify the provisioning parameters received by the VBS to securely provision the VBS.

Example 38 includes the subject matter of Examples 32-37, and wherein to perform the whitelist check comprises to verify the platform identifier corresponds to a valid platform identifier of a security policy accessible by the VBS.

Example 39 includes the subject matter of Examples 32-38, and further including a VBS agent security credential module to create the security credential in response to having (i) verified the authenticity of the security quote and the public key of the VNF instance and (ii) detected the registration request message is alive.

Example 40 includes the subject matter of Examples 32-39, and wherein the VBS agent communication module is further to (i) create a VBS public/private key pair that includes a public key and a private key and (ii) sign the start response message using a private key of the VBS public/private key pair, wherein to transmit the start response message comprises to transmit the signed start response message.

Example 41 includes the subject matter of Examples 32-40, and wherein the VBS agent communication module is further to sign the registration response message using the private key of the VBS public/private key pair, wherein to transmit the start response message comprises to transmit the signed start response message.

Example 42 includes the subject matter of Examples 32-41, and wherein to transmit the registration response message to the VBS agent comprises to transmit an identifier of a VNF manager that is communicatively coupled to the VBS agent, wherein the identifier is usable to identify the VNF manager to establish a communication channel with the VNF manager.

Example 43 includes the subject matter of Examples 32-42, and wherein to transmit the identifier of the VNF manager comprises to transmit at least one of an internet protocol (IP) address, a domain name server (DNS), a fully qualified domain name (FQDN), a uniform resource locator (URL).

Example 44 includes the subject matter of Examples 32-43, and wherein the VBS agent communication module is further to transmit a VNF activated message to a VNF manager that is usable by the VNF manager to set up a communication channel with the VNF instance.

Example 45 includes a method for bootstrapping virtual network functions in a network functions virtualization (NFV) network architecture, the method comprising receiving, by a VNF bootstrap service (VBS) of the NFV network architecture, a start message from a VBS agent of a VNF instance of the NFV network architecture that is communicatively coupled to the VBS, wherein the start message provides an indication that the VBS agent has been instantiated; transmitting, by the VBS and in response to receiving the start message, a start response message to the VBS agent; receiving, by the VBS and in response to transmitting the start response message, a registration request message from the VBS agent, wherein the registration request message includes a security quote and a security credential request to request a security credential from the VBS; validating, by the VBS and in response to receiving the security credential request of the registration request message, the security quote to authenticate the VBS agent as the transmitter of the registration request message; and transmitting, by the VBS and in response to validating the security quote, a registration response message to the VBS agent, wherein the registration response message includes a security credential that indicates the security quote has been validated by the VBS.

Example 46 includes the subject matter of Example 45 receiving the start message comprises receiving a first nonce, transmitting the start response message comprises transmitting the start response message signed by the VBS using a private key of the VBS, wherein the start response message includes the first nonce and a second nonce generated by the VBS, and receiving the security credential request comprises receiving the security credential request signed by the VNF instance using a private key of the VNF instance, wherein the security credential request includes the first nonce, the second nonce, and a public key of the VNF instance.

Example 47 includes the subject matter of Examples 45 and 46, and wherein transmitting the registration response message comprises transmitting the registration response message signed by the VBS using a private key of the VBS, wherein the registration response message further includes the first nonce, the second nonce, an identifier of a VNF manager responsible for managing the VBS agent, a set of VNF managers that are whitelisted, a set of VNF components (VNFCs) authorized by the VBS, a unique VNF instance identifier, and one or more policies, and wherein the one or more policies include instructions usable by the VBS agent to perform a particular function.

Example 48 includes the subject matter of Examples 45-47, and further including receiving, by the VBS, a set of provisioning parameters from a trusted execution environment (TEE) of a platform on which the VNF instance was created, wherein the provisioning parameters are usable to securely provision the VBS and include (i) a platform identifier unique to the platform on which the VNF instance was created, (ii) a public key of the VBS, and (iii) a unique identifier of the VBS; and provisioning the VBS based on the provisioning parameters.

Example 49 includes the subject matter of Examples 45-48, and further including verifying, by the VBS and in response to receiving the registration request message, an authenticity of the security quote based on a private key of the TEE, wherein the security quote was signed using the private key of the TEE; performing, by the VBS, a whitelist check to verify a configuration of the VBS; detecting, by the VBS, a liveness of the registration request message using the first and second nonce to ensure the first and second nonce have not expired; and verifying, by the VBS, an authenticity of the public key of the VNF instance.

Example 50 includes the subject matter of Examples 45-49, and wherein performing the whitelist check comprises verifying the provisioning parameters received by the VBS to securely provision the VBS.

Example 51 includes the subject matter of Examples 45-50, and wherein performing the whitelist check comprises verifying the platform identifier corresponds to a valid platform identifier of a security policy accessible by the VBS.

Example 52 includes the subject matter of Examples 45-51, and further including creating the security credential in response to having (i) verified the authenticity of the security quote and the public key of the VNF instance and (ii) detected the registration request message is alive.

Example 53 includes the subject matter of Examples 45-52, and further including creating a VBS public/private key pair that includes a public key and a private key; and signing the start response message using a private key of the VBS public/private key pair, wherein transmitting the start response message comprises transmitting the signed start response message.

Example 54 includes the subject matter of Examples 45-53, and further including signing the registration response message using the private key of the VBS public/private key pair, wherein transmitting the start response message comprises transmitting the signed start response message.

Example 55 includes the subject matter of Examples 45-54, and wherein transmitting the registration response message to the VBS agent comprises transmitting an identifier of a VNF manager that is communicatively coupled to the VBS agent, wherein the identifier is usable to identify the VNF manager to establish a communication channel with the VNF manager.

Example 56 includes the subject matter of Examples 45-55, and wherein transmitting the identifier of the VNF manager comprises transmitting at least one of an internet protocol (IP) address, a domain name server (DNS), a fully qualified domain name (FQDN), a uniform resource locator (URL).

Example 57 includes the subject matter of Examples 45-56, and further including transmitting a VNF activated message to a VNF manager that is usable by the VNF manager to set up a communication channel with the VNF instance.

Example 58 includes a computing device comprising a processor; and a memory having stored therein a plurality of instructions that when executed by the processor cause the computing device to perform the method of any of Examples 45-57.

Example 59 includes one or more machine readable storage media comprising a plurality of instructions stored thereon that in response to being executed result in a computing device performing the method of any of Examples 45-57.

Example 60 includes a virtual network function (VNF) bootstrap service (VBS) of a network functions virtualization (NFV) network architecture method for bootstrapping virtual network functions in the NFV network architecture, the VBS comprising means for receiving a start message from a VBS agent of a VNF instance of the NFV network architecture that is communicatively coupled to the VBS, wherein the start message provides an indication that the VBS agent has been instantiated; means for transmitting, in response to receiving the start message, a start response message to the VBS agent; means for receiving, in response to transmitting the start response message, a registration request message from the VBS agent, wherein the registration request message includes a security quote and a security credential request to request a security credential from the VBS; means for validating, in response to receiving the security credential request of the registration request message, the security quote to authenticate the VBS agent as the transmitter of the registration request message; and means for transmitting, in response to validating the security quote, a registration response message to the VBS agent, wherein the registration response message includes a security credential that indicates the security quote has been validated by the VBS.

Example 61 includes the subject matter of Example 60, and wherein the means for receiving the start message comprises means for receiving a first nonce, wherein the means for transmitting the start response message comprises means for transmitting the start response message signed by the VBS using a private key of the VBS, wherein the start response message includes the first nonce and a second nonce generated by the VBS, and wherein the means for receiving the security credential request comprises means for receiving the security credential request signed by the VNF instance using a private key of the VNF instance, wherein the security credential request includes the first nonce, the second nonce, and a public key of the VNF instance.

Example 62 includes the subject matter of Examples 60 and 61, and wherein the means for transmitting the registration response message comprises means for transmitting the registration response message signed by the VBS using a private key of the VBS, wherein the registration response message further includes the first nonce, the second nonce, an identifier of a VNF manager responsible for managing the VBS agent, a set of VNF managers that are whitelisted, a set of VNF components (VNFCs) authorized by the VBS, a unique VNF instance identifier, and one or more policies, and wherein the one or more policies include instructions usable by the VBS agent to perform a particular function.

Example 63 includes the subject matter of Examples 60-62, and further including means for receiving a set of provisioning parameters from a trusted execution environment (TEE) of a platform on which the VNF instance was created, wherein the provisioning parameters are usable to securely provision the VBS and include (i) a platform identifier unique to the platform on which the VNF instance was created, (ii) a public key of the VBS, and (iii) a unique identifier of the VBS; and means for provisioning the VBS based on the provisioning parameters.

Example 64 includes the subject matter of Examples 60-63, and further including means for verifying, in response to receiving the registration request message, an authenticity of the security quote based on a private key of the TEE, wherein the security quote was signed using the private key of the TEE; means for performing a whitelist check to verify a configuration of the VBS; means for detecting a liveness of the registration request message using the first and second nonce to ensure the first and second nonce have not expired; and means for verifying an authenticity of the public key of the VNF instance.

The invention claimed is:

1. A network functions virtualization (NFV) security controller of a NFV network architecture for bootstrapping virtual network functions in the NFV network architecture, the NFV security controller comprising:
   one or more processors; and
   one or more data storage devices having stored therein a plurality of instructions that, when executed by the one or more processors, cause a virtual network function (VNF) bootstrap service (VBS) of the NFV security controller to:
      receive a start message from a VBS agent of a VNF instance of the NFV network architecture that is communicatively coupled to the VBS, wherein the start message provides an indication that the VBS agent has been instantiate and includes a first nonce,
      transmit a start response message signed by the VBS using a private key of the VBS to the VBS agent in response to having received the start message, wherein the start response message includes the first nonce and a second nonce generated by the VBS,
      receive a registration request message from the VBS agent in response to having transmitted the start response message, wherein the registration request message includes a security quote and a security credential request to request a security credential from the VBS, wherein the security credential request is signed by the VNF instance using a private key of the VNF instance and includes the first nonce, the second nonce, and a public key of the VNF instance,
      validate, in response to having received the security credential request of the registration request message, the security quote to authenticate the VBS agent as the transmitter of the registration request message, and
      transmit, in response to having validated the security quote, a registration response message to the VBS agent, wherein the registration response message includes a security credential that indicates the security quote has been validated by the VBS.

2. The NFV security controller of claim 1, wherein to transmit the registration response message comprises to transmit the registration response message signed by the VBS using the private key of the VBS, wherein the registration response message further includes the first nonce, the second nonce, an identifier of a VNF manager responsible for managing the VBS agent, a set of VNF managers that are whitelisted, a set of VNF components (VNFCs) authorized by the VBS, a unique VNF instance identifier, and one or more policies, and wherein the one or more policies include instructions usable by the VBS agent to perform a particular function.

3. The NFV security controller of claim 1, wherein the plurality of instructions, when executed, further cause the VBS to receive a set of provisioning parameters from a trusted execution environment (TEE) of a platform on which the VNF instance was created, wherein the provisioning parameters are usable to securely provision the VBS and include (i) a platform identifier unique to the platform on which the VNF instance was created, (ii) a public key of the VBS, and (iii) a unique identifier of the VBS, and provision the VBS based on the provisioning parameters.

4. The NFV security controller of claim 3, wherein the plurality of instructions, when executed, further cause the VBS to (i) verify, in response to having received the registration request message, an authenticity of the security quote based on a private key of the TEE, wherein the security quote was signed using the private key of the TEE, (ii) perform a whitelist check to verify a configuration of the VBS, (iii) detect a liveness of the registration request message using the first and second nonce to ensure the first and second nonce have not expired, and (iv) verify an authenticity of the public key of the VNF instance.

5. The NFV security controller of claim 4, wherein to perform the whitelist check comprises to verify the provisioning parameters received by the VBS to securely provision the VBS.

6. The NFV security controller of claim 4, wherein to perform the whitelist check comprises to verify the platform identifier corresponds to a valid platform identifier of a security policy accessible by the VBS.

7. The NFV security controller of claim 3, wherein the plurality of instructions, when executed, further cause the VBS to create the security credential in response to having (i) verified the authenticity of the security quote and the public key of the VNF instance and (ii) detected the registration request message is alive.

8. The NFV security controller of claim 1, wherein the plurality of instructions, when executed, further cause the VBS to (i) create a VBS public/private key pair that includes a public key and a private key and (ii) sign the start response message using a private key of the VBS public/private key pair, wherein to transmit the start response message comprises to transmit the signed start response message.

9. The NFV security controller of claim 8, wherein the plurality of instructions, when executed, further cause the VBS to sign the registration response message using the private key of the VBS public/private key pair, wherein to transmit the start response message comprises to transmit the signed start response message.

10. The NFV security controller of claim 1, wherein to transmit the registration response message to the VBS agent comprises to transmit an identifier of a VNF manager that is communicatively coupled to the VBS agent, wherein the identifier is usable to identify the VNF manager to establish a communication channel with the VNF manager.

11. The NFV security controller of claim 10, wherein to transmit the identifier of the VNF manager comprises to transmit at least one of an internet protocol (IP) address, a domain name server (DNS), a fully qualified domain name (FQDN), a uniform resource locator (URL).

12. The NFV security controller of claim 1, wherein the plurality of instructions, when executed, further cause the VBS to transmit a VNF activated message to a VNF manager that is usable by the VNF manager to set up a communication channel with the VNF instance.

13. One or more non-transitory, computer-readable storage media comprising a plurality of instructions stored thereon that, when executed, cause a virtual network function (VNF) bootstrap service (VBS) of a network functions virtualization (NFV) security controller of a NFV network architecture to:
receive a start message from a VBS agent of a VNF instance of the NFV network architecture that is communicatively coupled to the VBS, wherein the start message provides an indication that the VBS agent has been instantiated and includes a first nonce;
transmit, in response to having received the start message, a start response message signed by the VBS using a private key of the VBS to the VBS agent, wherein the start response message includes the first nonce and a second nonce generated by the VBS;
receive, in response to having transmitted the start response message, a registration request message from the VBS agent, wherein the registration request message includes a security quote and a security credential request to request a security credential from the VBS, wherein the security credential request is signed by the VNF instance using a private key of the VNF instance and includes the first nonce, the second nonce, and a public key of the VNF instance;
validate, in response to having received the security credential request of the registration request message, the security quote to authenticate the VBS agent as the transmitter of the registration request message; and
transmit, in response to having validated the security quote, a registration response message to the VBS agent, wherein the registration response message includes a security credential that indicates the security quote has been validated by the VBS.

14. The one or more non-transitory, computer-readable storage media of claim 13, wherein to transmit the registration response message comprises to transmit the registration response message signed by the VBS using the private key of the VBS, wherein the registration response message further includes the first nonce, the second nonce, an identifier of a VNF manager responsible for managing the VBS agent, a set of VNF managers that are whitelisted, a set of VNF components (VNFCs) authorized by the VBS, a unique VNF instance identifier, and one or more policies, and wherein the one or more policies include instructions usable by the VBS agent to perform a particular function.

15. The one or more non-transitory, computer-readable storage media of claim 13, wherein the plurality of instructions, when executed, further cause the VBS to:
receive a set of provisioning parameters from a trusted execution environment (TEE) of a platform on which the VNF instance was created, wherein the provisioning parameters are usable to securely provision the VBS and include (i) a platform identifier unique to the platform on which the VNF instance was created, (ii) a public key of the VBS, and (iii) a unique identifier of the VBS; and
provision the VBS based on the provisioning parameters.

16. The one or more non-transitory, computer-readable storage media of claim 15, wherein the plurality of instructions, when executed, further cause the VBS to:
verify, in response to having received the registration request message, an authenticity of the security quote based on a private key of the TEE, wherein the security quote was signed using the private key of the TEE;
perform a whitelist check to verify a configuration of the VBS;

detect a liveness of the registration request message using the first and second nonce to ensure the first and second nonce have not expired; and verify an authenticity of the public key of the VNF instance.

17. The one or more non-transitory, computer-readable storage media of claim 16, wherein to perform the whitelist check comprises to verify the provisioning parameters received by the VBS to securely provision the VBS.

18. The one or more non-transitory, computer-readable storage media of claim 16, wherein to perform the whitelist check comprises to verify the platform identifier corresponds to a valid platform identifier of a security policy accessible by the VBS.

19. The one or more non-transitory, computer-readable storage media of claim 15, wherein the plurality of instructions, when executed, further cause the VBS to create the security credential in response to having (i) verified the authenticity of the security quote and the public key of the VNF instance and (ii) detected the registration request message is alive.

20. A method for bootstrapping virtual network functions in a network functions virtualization (NFV) network architecture, the method comprising:

receiving, by a VNF bootstrap service (VBS) of a network functions virtualization (NFV) security controller of the NFV network architecture, a start message from a VBS agent of a VNF instance of the NFV network architecture that is communicatively coupled to the VBS, wherein the start message provides an indication that the VBS agent has been instantiated and includes a first nonce;

transmitting, by the VBS and in response to receiving the start message, a start response message signed by the VBS using a private key of the VBS to the VBS agent, wherein the start response message includes the first nonce and a second nonce generated by the VBS;

receiving, by the VBS and in response to transmitting the start response message, a registration request message from the VBS agent, wherein the registration request message includes a security quote and a security credential request to request a security credential from the VBS, wherein the security credential request is signed by the VNF instance using a private key of the VNF instance and includes the first nonce, the second nonce, and a public key of the VNF instance;

validating, by the VBS and in response to receiving the security credential request of the registration request message, the security quote to authenticate the VBS agent as the transmitter of the registration request message; and transmitting, by the VBS and in response to validating the security quote, a registration response message to the VBS agent, wherein the registration response message includes a security credential that indicates the security quote has been validated by the VBS.

21. The method of claim 20, wherein:

receiving the start message comprises receiving a first nonce, transmitting the start response message comprises transmitting the start response message signed by the VBS using a private key of the VBS, wherein the start response message includes the first nonce and a second nonce generated by the VBS, and receiving the security credential request comprises receiving the security credential request signed by the VNF instance using a private key of the VNF instance, wherein the security credential request includes the first nonce, the second nonce, and a public key of the VNF instance.

22. The method of claim 20, further comprising:

receiving, by the VBS, a set of provisioning parameters from a trusted execution environment (TEE) of a platform on which the VNF instance was created, wherein the provisioning parameters are usable to securely provision the VBS and include (i) a platform identifier unique to the platform on which the VNF instance was created, (ii) a public key of the VBS, and (iii) a unique identifier of the VBS; and provisioning the VBS based on the provisioning parameters.

23. The method of claim 22, further comprising:

verifying, by the VBS and in response to receiving the registration request message, an authenticity of the security quote based on a private key of the TEE, wherein the security quote was signed using the private key of the TEE;

performing, by the VBS, a whitelist check to verify a configuration of the VBS;

detecting, by the VBS, a liveness of the registration request message using the first and second nonce to ensure the first and second nonce have not expired; and verifying, by the VBS, an authenticity of the public key of the VNF instance.

* * * * *